US011823134B2

(12) United States Patent
Phillips et al.

(10) Patent No.: US 11,823,134 B2
(45) Date of Patent: Nov. 21, 2023

(54) COMPENSATION MANAGEMENT SYSTEM AND METHOD

(71) Applicant: BCIT, LLC, Centennial, CO (US)

(72) Inventors: Michael J. Phillips, Englewood, CO (US); Michael C. Smith, Lone Tree, CO (US); Cynthia Chen, Denver, CO (US); Travis J. Haley, Centennial, CO (US); Sean T. Cacace, Denver, CO (US)

(73) Assignee: BCIT, LLC, Denver, CO (US)

( * ) Notice: Subject to any disclaimer, the term of this patent is extended or adjusted under 35 U.S.C. 154(b) by 297 days.

(21) Appl. No.: 16/863,743

(22) Filed: Apr. 30, 2020

(65) Prior Publication Data

US 2020/0349516 A1 Nov. 5, 2020

Related U.S. Application Data

(60) Provisional application No. 62/840,959, filed on Apr. 30, 2019.

(51) Int. Cl.
*G06Q 10/10* (2023.01)
*G06Q 30/02* (2023.01)
(Continued)

(52) U.S. Cl.
CPC .......... *G06Q 10/105* (2013.01); *G06Q 10/04* (2013.01); *G06Q 10/06398* (2013.01);
(Continued)

(58) Field of Classification Search
CPC ................. G06Q 10/105; G06Q 10/04; G06Q 10/063114; G06Q 10/06398;
(Continued)

(56) References Cited

U.S. PATENT DOCUMENTS 6,055,511 A 4/2000 Luebbering
6,668,253 B1 12/2003 Thompson et al.
(Continued)

FOREIGN PATENT DOCUMENTS

WO 2010045456 A1 4/2010

OTHER PUBLICATIONS

International Search Report and Written Opinion of the International Searching Authority for International PCT Application No. PCT/US2020/030855 dated Jul. 24, 2020; 10 pages.
(Continued)

*Primary Examiner* — Jonathan P Ouellette
(74) *Attorney, Agent, or Firm* — Brian J. Colandreo; William H. Oliver, III; Holland & Knight LLP

(57) ABSTRACT

A computer-implemented method, computer program product and computing system for: enabling a user to define a first compensation plan for one or more performance-based employees within an automotive space; enabling the user to define a second compensation plan for the one or more performance-based employees within the automotive space; and comparing the first compensation plan to the second compensation plan to determine one or more differential characteristics for the second compensation plan with respect to the first compensation plan.

48 Claims, 11 Drawing Sheets

(51) Int. Cl.

| | | |
|---|---|---|
| *G06Q 30/08* | (2012.01) | |
| *G06Q 10/105* | (2023.01) | |
| *G06Q 20/42* | (2012.01) | |
| *G06Q 40/12* | (2023.01) | |
| *G06Q 10/0639* | (2023.01) | |
| *G06Q 30/01* | (2023.01) | |
| *G06Q 10/04* | (2023.01) | |
| *G06Q 10/1057* | (2023.01) | |
| *G06Q 30/018* | (2023.01) | |
| *G06Q 30/0282* | (2023.01) | |
| *G06Q 50/00* | (2012.01) | |
| *G06Q 10/0631* | (2023.01) | |
| *G06Q 50/04* | (2012.01) | |

(52) U.S. Cl.
CPC . *G06Q 10/063114* (2013.01); *G06Q 10/1057* (2013.01); *G06Q 20/42* (2013.01); *G06Q 30/01* (2013.01); *G06Q 30/018* (2013.01); *G06Q 30/0185* (2013.01); *G06Q 30/0282* (2013.01); *G06Q 40/125* (2013.12); *G06Q 50/01* (2013.01); *G06Q 50/04* (2013.01)

(58) Field of Classification Search
CPC .... G06Q 10/1057; G06Q 20/42; G06Q 30/01; G06Q 30/018; G06Q 30/0185; G06Q 30/0282; G06Q 40/125; G06Q 50/01; G06Q 50/04; G06Q 10/087; G06Q 40/12; Y02P 90/30
USPC .................................. 705/1.1, 320, 322, 321
See application file for complete search history.

(56) References Cited

U.S. PATENT DOCUMENTS

| | | | |
|---|---|---|---|
| 6,970,831 B1* | 11/2005 | Anderson | G06Q 30/0203 |
| | | | 186/35 |
| 8,086,482 B2 | 12/2011 | Silvera | |
| 8,265,968 B2 | 9/2012 | Yaskin | |
| 8,781,882 B1 | 7/2014 | Arboletti et al. | |
| 11,087,412 B1 | 8/2021 | Ho | |
| 2001/0049622 A1 | 12/2001 | Gozdeck et al. | |
| 2002/0035506 A1 | 3/2002 | Loya | |
| 2002/0046110 A1 | 4/2002 | Gallagher | |
| 2003/0009373 A1* | 1/2003 | Ensing | G06Q 10/0637 |
| | | | 705/7.29 |
| 2003/0046196 A1 | 3/2003 | Kelly | |
| 2003/0050830 A1 | 3/2003 | Troyer | |
| 2003/0200142 A1 | 10/2003 | Hicks et al. | |
| 2005/0192823 A1* | 9/2005 | Kuhn | G06Q 10/06398 |
| | | | 705/321 |
| 2006/0080116 A1 | 4/2006 | Maguire | |
| 2006/0085258 A1 | 4/2006 | Montgomery | |
| 2006/0136315 A1 | 6/2006 | Muthiki et al. | |
| 2007/0260513 A1 | 8/2007 | Pavlov | |
| 2007/0255776 A1 | 10/2007 | O'Brien | |
| 2008/0040206 A1 | 2/2008 | Silvera et al. | |
| 2008/0281707 A1* | 11/2008 | McGinty | G06Q 30/0211 |
| | | | 705/14.13 |
| 2009/0138342 A1 | 5/2009 | Otto | |
| 2009/0271252 A1 | 10/2009 | AmEnde | |
| 2010/0100427 A1 | 4/2010 | McKeown et al. | |
| 2012/0053952 A1* | 3/2012 | Upadhyaya | G06Q 10/10 |
| | | | 705/1.1 |
| 2012/0265648 A1 | 10/2012 | Jerome | |
| 2012/0284036 A1 | 11/2012 | Evans | |
| 2013/0006883 A1 | 1/2013 | McKeown et al. | |
| 2013/0238403 A1 | 9/2013 | Benson | |
| 2014/0324645 A1 | 10/2014 | Stiffler | |
| 2015/0243793 A1 | 8/2015 | Jeong et al. | |
| 2015/0269512 A1 | 9/2015 | Wartel | |
| 2016/0026981 A1 | 1/2016 | Collins et al. | |
| 2016/0104184 A1 | 4/2016 | Yacobi | |
| 2016/0140463 A1* | 5/2016 | Ezry | G06Q 10/0639 |
| | | | 705/7.38 |
| 2016/0224205 A1* | 8/2016 | Fulton | G06F 3/0481 |
| 2016/0260107 A1 | 9/2016 | Seth | |
| 2017/0221002 A1* | 8/2017 | Sun | G06Q 10/105 |
| 2017/0236182 A1 | 8/2017 | Ignatyev | |
| 2017/0286888 A1 | 10/2017 | Merg et al. | |
| 2017/0316382 A1* | 11/2017 | Colner | G06Q 40/06 |
| 2018/0150912 A1* | 5/2018 | Ray | G06Q 40/12 |

OTHER PUBLICATIONS

International Search Report and Written Opinion of the International Searching Authority for International PCT Application No. PCT/US2020/030866 dated Jul. 24, 2020; 18 pages.
International Search Report and Written Opinion of the International Searching Authority for International PCT Application No. PCT/US2020/030848 dated Jul. 21, 2020; 18 pages.
International Search Report and Written Opinion of the International Searching Authority for International PCT Application No. PCT/US2020/030863 dated Jul. 27, 2020; 11 pages.
Non-Final Office Action issued in related U.S. Appl. No. 16/863,787 dated Jun. 24, 2021.
Non-Final Office Action issued in related U.S. Appl. No. 16/863,667 dated Sep. 1, 2021.
Non-Final Office Action issued in related U.S. Appl. No. 16/863,796 dated May 3, 2021.
Non-Final Office Action issued in related U.S. Appl. No. 16/863,760 dated Aug. 20, 2021.
Non-Final Office Action issued in related U.S. Appl. No. 16/863,692 dated Aug. 19, 2021.
Non-Final Office Action issued in related U.S. Appl. No. 16/863,724 dated Sep. 30, 2021.
Non-Final Office Action issued in related U.S. Appl. No. 16/863,814 dated Nov. 4, 2021.
Non-Final Office Action issued in U.S. Appl. No. 16/863,692 dated Sep. 13, 2022.
Non-Final Office Action issued in U.S. Appl. No. 16/863,760 dated Sep. 15, 2022.
Non-Final Office Action issued in U.S. Appl. No. 16/863,667 dated Sep. 19, 2022.
Non-Final Office Action issued in U.S. Appl. No. 16/863,724 dated Sep. 21, 2022.
Final Office Action issued in related U.S. Appl. No. 16/863,796 dated Jan. 13, 2022.
Final Office Action issued in related U.S. Appl. No. 16/863,692 dated Feb. 24, 2022.
Final Office Action issued in related U.S. Appl. No. 16/863,667 dated Feb. 28, 2022.
Final Office Action issued in related U.S. Appl. No. 16/863,760 dated Feb. 28, 2022.
Final Office Action issued in related U.S. Appl. No. 16/863,760 dated Mar. 3, 2022.
Final Office Action issued in U.S. Appl. No. 16/863,787 dated Apr. 11, 2022.
Non-Final Office Action issued in U.S. Appl. No. 16/863,796 dated May 5, 2022.
Final Office Action issued in related U.S. Appl. No. 16/863,814 dated May 20, 2022.
Non-Final Office Action issued in U.S. Appl. No. 16/863,743 dated Jun. 24, 2022.
Non-Final Office Action issued in U.S. Appl. No. 16/863,840 dated Jun. 24, 2022.
Final Office Action issued in related U.S. Appl. No. 16/863,692 dated Jun. 15, 2023.
Non-Final Office Action issued in U.S. Appl. No. 16/863,787 dated Dec. 27, 2022.
Final Office Action issued in related U.S. Appl. No. 16/863,796 dated Dec. 14, 2022.
Non-Final Office Action issued in related U.S. Appl. No. 16/863,814 dated Feb. 23, 2023.
Non-Final Office Action issued in related U.S. Appl. No. 16/863,840 dated May 10, 2023.

(56) References Cited

OTHER PUBLICATIONS

Notice Of Allowance issued in related U.S. Appl. No. 16/863,840 dated Sep. 1, 2023.

\* cited by examiner

10

```
┌─────────────────────────┐      ┌───────────────────────────────────────────────┐
│ enabling a user to      │      │ enabling the user to define the first         │
│ define a first          │      │ compensation plan for one or more             │
│ compensation plan for   │      │ performance-based employees by                │
│ one or more             │──┐   │ selecting the first compensation plan from a  │
│ performance-based       │  │   │ plurality of available compensation plans (302)│
│ employees within an     │  │   └───────────────────────────────────────────────┘
│ automotive space (300)  │  │   ┌───────────────────────────────────────────────┐
└─────────────────────────┘  │   │ enabling the user to define a bespoke first   │
           │                 └──▶│ compensation plan for the one or more         │
           ▼                     │ performance-based employees (304)             │
                                 └───────────────────────────────────────────────┘
``` enabling a user to define a first compensation plan for one or more performance-based employees within an automotive space (300)

enabling the user to define the first compensation plan for one or more performance-based employees by selecting the first compensation plan from a plurality of available compensation plans (302)

enabling the user to define a bespoke first compensation plan for the one or more performance-based employees (304)

enabling the user to define a second compensation plan for the one or more performance-based employees within the automotive space (306)

enabling the user to define the second compensation plan for one or more performance-based employees by selecting the second compensation plan from a plurality of available compensation plans (308)

enabling the user to define a bespoke second compensation plan for the one or more performance-based employees (310)

comparing the first compensation plan to the second compensation plan to determine one or more differential characteristics for the second compensation plan with respect to the first compensation plan (312)

utilizing historical performance information of the one or more performance-based employees to determine the one or more differential characteristics for the second compensation plan with respect to the first compensation plan (314)

utilizing predicted performance information of the one or more performance-based employees to determine the one or more differential characteristics for the second compensation plan with respect to the first compensation plan (316)

distributing the one or more differential characteristics with respect to a plurality of performance information indicators (318)

FIG. 4

COMPENSATION MANAGEMENT SYSTEM AND METHOD

RELATED APPLICATION(S)

This application claims the benefit of U.S. Provisional Application No. 62/840,959, filed on 30 Apr. 2019, the entire contents of which is herein incorporated by reference.

TECHNICAL FIELD

This disclosure relates to management systems and, more particularly, to compensation management systems for performance-based employees.

BACKGROUND

In business, employees are often compensated based upon performance. For example, people that assemble items may be paid based upon the quantity of items that they assemble. Additionally, salespeople may be compensated based upon the value of the products that they are selling. These performance-based employees are often compensated based upon a commission, wherein e.g., they may earn X % of whatever they sell, or Y % of the profit of whatever they sell.

Unfortunately, it is often difficult for these performance-based employees (and the organizations for which they work) to keep track off and stay current with respect to the earnings/compensation of these employees.

SUMMARY OF DISCLOSURE

Concept #3

In one implementation, a compensation management method is executed on a computing device and includes: enabling a user to define a first compensation plan for one or more performance-based employees within an automotive space; enabling the user to define a second compensation plan for the one or more performance-based employees within the automotive space; and comparing the first compensation plan to the second compensation plan to determine one or more differential characteristics for the second compensation plan with respect to the first compensation plan.

One or more of the following features may be included. Comparing the first compensation plan to the second compensation plan to determine one or more differential characteristics for the second compensation plan with respect to the first compensation plan may include: utilizing historical performance information of the one or more performance-based employees to determine the one or more differential characteristics for the second compensation plan with respect to the first compensation plan. The historical performance information may include historical sales performance information. The historical performance information may include historical supplemental performance information. The historical supplemental performance information may include one or more of: an inventory age indicator; a minimum wage indicator; an hours worked indicator; an employment history indicator; a customer feedback indicator; an economic indicator; a team rating indicator; an individual rating indicator; and an organization rating indicator. Comparing the first compensation plan to the second compensation plan to determine one or more differential characteristics for the second compensation plan with respect to the first compensation plan may include: utilizing predicted performance information of the one or more performance-based employees to determine the one or more differential characteristics for the second compensation plan with respect to the first compensation plan. The predicted performance information may include predicted sales performance information. The predicted performance information may include predicted supplemental performance information. The predicted supplemental performance information may include one or more of: an inventory age indicator; a minimum wage indicator; an hours worked indicator; an employment history indicator; a customer feedback indicator; an economic indicator; a team rating indicator; an individual rating indicator; and an organization rating indicator. The automotive space may include one or more of: an automotive sales space; an automotive service space; an automotive body shop space; an automotive, finance & insurance space; an automotive administrative space; an automotive franchisor space; and an automotive parts space. The one or more performance-based employees may be one or more performance-based sellers of products. The one or more performance-based employees may be one or more performance-based sellers of services. Enabling a user to define a first compensation plan for one or more performance-based employees may include: enabling the user to define the first compensation plan for one or more performance-based employees by selecting the first compensation plan from a plurality of available compensation plans. Enabling a user to define a first compensation plan for one or more performance-based employees may include: enabling the user to define a bespoke first compensation plan for the one or more performance-based employees. Enabling a user to define a second compensation plan for one or more performance-based employees may include: enabling the user to define the second compensation plan for one or more performance-based employees by selecting the second compensation plan from a plurality of available compensation plans. Enabling a user to define a second compensation plan for one or more performance-based employees may include: enabling the user to define a bespoke second compensation plan for the one or more performance-based employees. Comparing the first compensation plan to the second compensation plan to determine one or more differential characteristics for the second compensation plan with respect to the first compensation plan may include: distributing the one or more differential characteristics with respect to a plurality of performance information indicators.

In another implementation, a computer program product resides on a computer readable medium and has a plurality of instructions stored on it. When executed by a processor, the instructions cause the processor to perform operations including: enabling a user to define a first compensation plan for one or more performance-based employees within an automotive space; enabling the user to define a second compensation plan for the one or more performance-based employees within the automotive space; and comparing the first compensation plan to the second compensation plan to determine one or more differential characteristics for the second compensation plan with respect to the first compensation plan.

One or more of the following features may be included. Comparing the first compensation plan to the second compensation plan to determine one or more differential characteristics for the second compensation plan with respect to the first compensation plan may include: utilizing historical performance information of the one or more performance-based employees to determine the one or more differential characteristics for the second compensation plan with respect to the first compensation plan. The historical performance information may include historical sales performance information. The historical performance information may include historical supplemental performance information. The historical supplemental performance information may include one or more of: an inventory age indicator; a minimum wage indicator; an hours worked indicator; an employment history indicator; a customer feedback indicator; an economic indicator; a team rating indicator; an individual rating indicator; and an organization rating indicator. Comparing the first compensation plan to the second compensation plan to determine one or more differential characteristics for the second compensation plan with respect to the first compensation plan may include: utilizing predicted performance information of the one or more performance-based employees to determine the one or more differential characteristics for the second compensation plan with respect to the first compensation plan. The predicted performance information may include predicted sales performance information. The predicted performance information may include predicted supplemental performance information. The predicted supplemental performance information may include one or more of: an inventory age indicator; a minimum wage indicator; an hours worked indicator; an employment history indicator; a customer feedback indicator; an economic indicator; a team rating indicator; an individual rating indicator; and an organization rating indicator. The automotive space may include one or more of: an automotive sales space; an automotive service space; an automotive body shop space; an automotive finance & insurance space; an automotive administrative space; an automotive franchisor space; and an automotive parts space. The one or more performance-based employees may be one or more performance-based sellers of products. The one or more performance-based employees may be one or more performance-based sellers of services. Enabling a user to define a first compensation plan for one or more performance-based employees may include: enabling the user to define the first compensation plan for one or more performance-based employees by selecting the first compensation plan from a plurality of available compensation plans. Enabling a user to define a first compensation plan for one or more performance-based employees may include: enabling the user to define a bespoke first compensation plan for the one or more performance-based employees. Enabling a user to define a second compensation plan for one or more performance-based employees may include: enabling the user define the second compensation plan for one or more performance-based employees by selecting the second compensation plan from a plurality of available compensation plans. Enabling a user to define a second compensation plan for one or more performance-based employees may include: enabling the user to define a bespoke second compensation plan for the one or more performance-based employees. Comparing the first compensation plan to the second compensation plan to determine one or more differential characteristics for the second compensation plan with respect to the first compensation plan may include: distributing the one or more differential characteristics with respect to a plurality of performance information indicators.

In another implementation, a computing system includes a processor and memory is configured to perform operations including: enabling a user to define a first compensation plan for one or more performance-based employees within an automotive space; enabling the user to define a second compensation plan for the one or more performance-based employees within the automotive space; and comparing the first compensation plan to the second compensation plan to determine one or more differential characteristics for the second compensation plan with respect to the first compensation plan.

One or more of the following features may be included. Comparing the first compensation plan to the second compensation plan to determine one or more differential characteristics for the second compensation plan with respect to the first compensation plan may include: utilizing historical performance information of the one or more performance-based employees to determine the one or more differential characteristics for the second compensation plan with respect to the first compensation plan. The historical performance information may include historical sales performance information. The historical performance information may include historical supplemental performance information. The historical supplemental performance information may include one or more of: an inventory age indicator; a minimum wage indicator; an hours worked indicator; an employment history indicator; a customer feedback indicator; an economic indicator; a team rating indicator; an individual rating indicator; and an organization rating indicator. Comparing the first compensation plan to the second compensation plan to determine one or more differential characteristics for the second compensation plan with respect to the first compensation plan may include: utilizing predicted performance information of the one or more performance-based employees to determine the one or more differential characteristics for the second compensation plan with respect to the first compensation plan. The predicted performance information may include predicted sales performance information. The predicted performance information may include predicted supplemental performance information. The predicted supplemental performance information may include one or more of: an inventory age indicator; a minimum wage indicator; an hours worked indicator; an employment history indicator; a customer feedback indicator; an economic indicator; a team rating indicator; an individual rating indicator; and an organization rating indicator. The automotive space may include one or more of: an automotive sales space; an automotive service space; an automotive body shop space; an automotive finance & insurance space; an automotive administrative space; an automotive franchisor space; and an automotive parts space. The one or more performance-based employees may be one or more performance-based sellers of products. The one or more performance-based employees may be one or more performance-based sellers of services. Enabling a user to define a first compensation plan for one or more performance-based employees may include: enabling the user to define the first compensation plan for one or more performance-based employees by selecting the first compensation plan from a plurality of available compensation plans. Enabling a user to define a first compensation plan for one or more performance-based employees may include: enabling the user to define a bespoke first compensation plan for the one or more performance-based employees. Enabling a user to define a second compensation plan for one or more performance-based employees may include: enabling the user define the second compensation plan for one or more performance-based employees by selecting the second compensation plan from a plurality of available compensation plans. Enabling a user to define a second compensation plan for one or more performance-based employees may include: enabling the user to define a bespoke second compensation plan for the one or more performance-based employees. Comparing the first compensation plan to the second compensation plan to determine one or more differential characteristics for the second compensation plan with respect to the first compensation plan may include: distributing the one or more differential characteristics with respect to a plurality of performance information indicators.

The details of one or more implementations are set forth in the accompanying drawings and the description below, Other features and advantages will become apparent from the description, the drawings, and the claims.

BRIEF DESCRIPTION OF THE DRAWINGS

FIG. 4 is a flowchart of an implementation of the compensation management process of FIG. 1 according to an embodiment of the present disclosure;

Like reference symbols in the various drawings indicate like elements.

DETAILED DESCRIPTION OF THE PREFERRED EMBODIMENTS

System Overview

Figure 1:
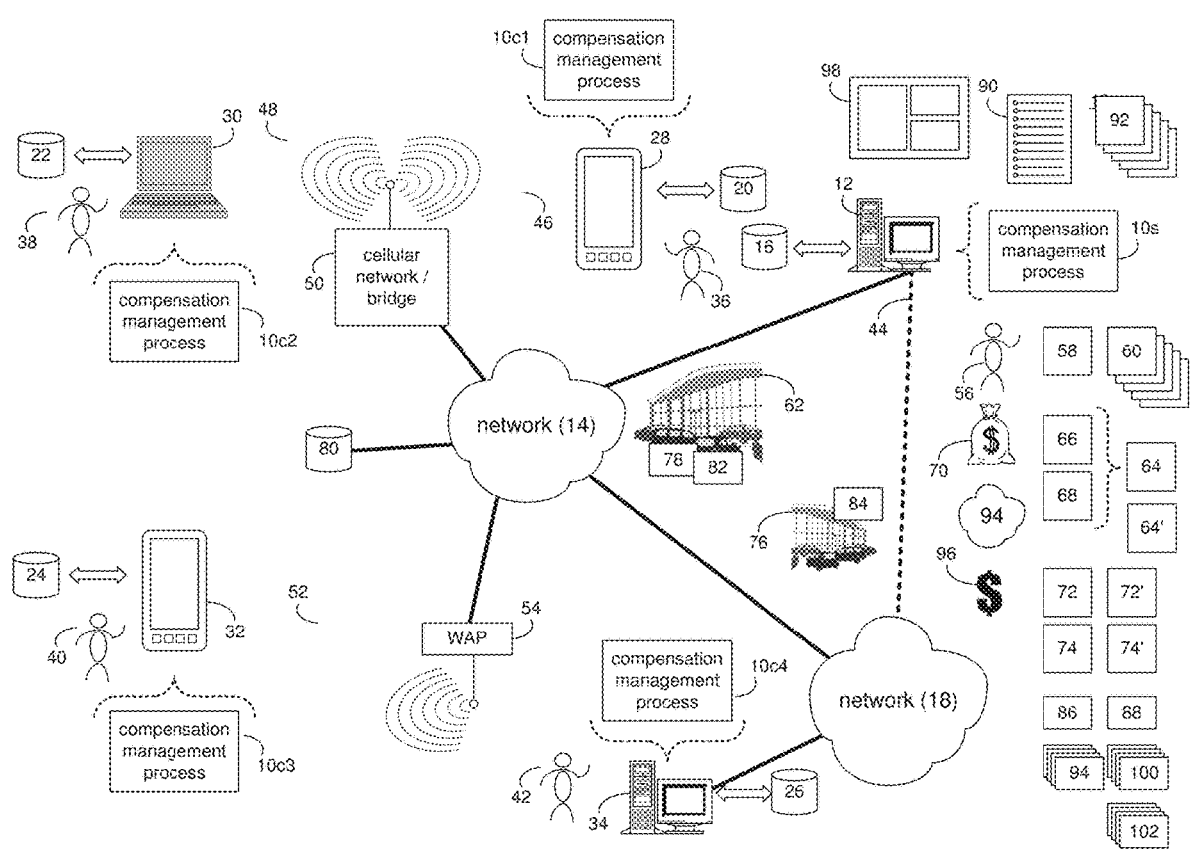
FIG. 1 is a diagrammatic view of a distributed computing network including a computing device that executes a compensation management process according to an embodiment of the present disclosure.

Referring to FIG. 1, there is shown compensation management process 10. Compensation management process 10 may be implemented as a server-side process, a client-side process, or a hybrid server-side/client-side process. For example, compensation management process 10 may be implemented as a purely server-side process via compensation management process 10s. Alternatively, compensation management process 10 may be implemented as a purely client-side process via one or more of compensation management process 10c1, compensation management process 10c2, compensation management process 10c3, and compensation management process 10c4. Alternatively still, compensation management process 10 may be implemented as a hybrid server-side/client-side process via compensation management process 10s in combination with one or more of compensation management process 10c1, compensation management process 10c2, compensation management process 10c3, and compensation management process 10c4. Accordingly, compensation management process 10 as used in this disclosure may include any combination of compensation management process 10s, compensation management process 10c1, compensation management process 10c2, compensation management process 10c3, and compensation management process 10c4.

Compensation management process 10s may be a server application and may reside on and may be executed by computing device 12, which may be connected to network 14 (e.g., the Internet or a local area network). Examples of computing device 12 may include, but are not limited to: a personal computer, a laptop computer, a personal digital assistant, a data-enabled cellular telephone, a notebook computer, a television with one or more processors embedded therein or coupled thereto, a cable/satellite receiver with one or more processors embedded therein or coupled thereto, a server computer, a series of server computers, a mini computer, a mainframe computer, or a cloud-based computing network.

The instruction sets and subroutines of compensation management process 10s, which may be stored on storage device 16 coupled to computing device 12, may be executed by one or more processors (not shown) and one or more memory architectures (not shown) included within computing device 12. Examples of storage device 16 may include but are not limited to: a hard disk drive; a RAID device; a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Examples of compensation management processes 10c1, 10c2, 10c3, 10c4 may include but are not limited to a client application, a web browser, a game console user interface, or a specialized application (e.g., an application running on e.g., the Android™ platform or the iOS™ platform). The instruction sets and subroutines of compensation management processes 10c1, 10c2, 10c3, 10c4, which may be stored on storage devices 20, 22, 24, 26 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Examples of storage devices 20, 22, 24, 26 may include but are not limited to: a hard disk drive; a RAID device; a random access memory (RAM); a read-only memory (ROM); and all forms of flash memory storage devices.

Examples of client electronic devices 28, 30, 32, 34 may include, but are not limited to, data-enabled, cellular telephone 28, laptop computer 30, personal digital assistant 32, personal computer 34, a notebook computer (not shown), a server computer (not shown), a gaming console (not shown), a smart television (not shown), and a dedicated network device (not shown). Client electronic devices 28, 30, 32, 34 may each execute an operating system, examples of which may include but are not limited to Microsoft Windows™, Android™, WebOS™, iOS™, Redhat Linux™, or a custom operating system.

Users 36, 38, 40, 42 may access compensation management process 10 directly through network 14 or through secondary network 18. Further, compensation management process 10 may be connected to network 14 through secondary network 18, as illustrated with link line 44.

The various client electronic devices (e.g., client electronic devices 28, 30, 32, 34) may be directly or indirectly coupled to network 14 (or network 18). For example, data-enabled, cellular telephone 28 and laptop computer 30 are shown wirelessly coupled to network 14 via wireless communication channels 46, 48 (respectively) established between data-enabled, cellular telephone 28, laptop computer 30 (respectively) and cellular network/bridge 50, which is shown directly coupled to network 14. Further, personal digital assistant 32 is shown wirelessly coupled to network 14 via wireless communication channel 52 established between personal digital assistant 32 and wireless access point (i.e., WAP) 54, which is shown directly coupled to network 14. Additionally, personal computer 34 is shown directly coupled to network 18 via a hardwired network connection.

WAP 54 may be, for example, an IEEE 802.11a, 802.11b, 802.11g, 802.11n, Wi-Fi, and/or Bluetooth device that is capable of establishing wireless communication channel 52 between personal digital assistant 32 and WAP 54. As is known in the a IEEE 802.11x specifications may use Ethernet protocol and carrier sense multiple access with collision avoidance i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Compensation Management Process

As will be discussed below in greater detail, compensation management process 10 may be configured and/or utilized to monitor/incentivize the performance of a performance-based employee of a company. Examples of such a performance-based employee of the company may include but are not limited to a performance-based seller of products and/or a performance-based seller of services.

While much of the following discussion concerns compensation management process 10 being utilized within an automotive space (e.g., an automotive sales space, an automotive service space, an automotive body shop space, an automotive finance space, an automotive insurance space, an automotive administrative space, an automotive franchise or space, and an automotive parts space), this is for illustrative purposes only and is not intended to be a limitation of this disclosure, as other configurations are considered to be within the scope of this disclosure. For example, it is understood that compensation management process 10 may be utilized in any other spaces in which it may be desirable to monitor/incentive the performance of performance-based employees (e.g., a retail space; a healthcare space; a financial space; a manufacturing space; a hospitality space; a travel space; a pharmaceutical space; a technology space; and a real estate space.

As is known, performance-based employees may be compensated based upon many different factors. For example, performance-based employees may be paid a flat percentage-based commission based upon the products or services they sell. However, often times such compensation plans are not as straightforward. For example, a performance-based employee may be paid a first percentage up to a first level of sales and may be paid one or more other percentages above such first level of sales. Additionally, various promotions may be built into such compensation plans. For example, performance-based employees may be incentivized to sell certain items and/or services. For example, a car salesman may be incentivized to move older inventory and/or sell maintenance plans. Additionally, a telecom salesperson may be incentivized to sell higher level data plans, wherein an electronics salesperson may be incentivized to sell damage protection plans.

Figure 2:
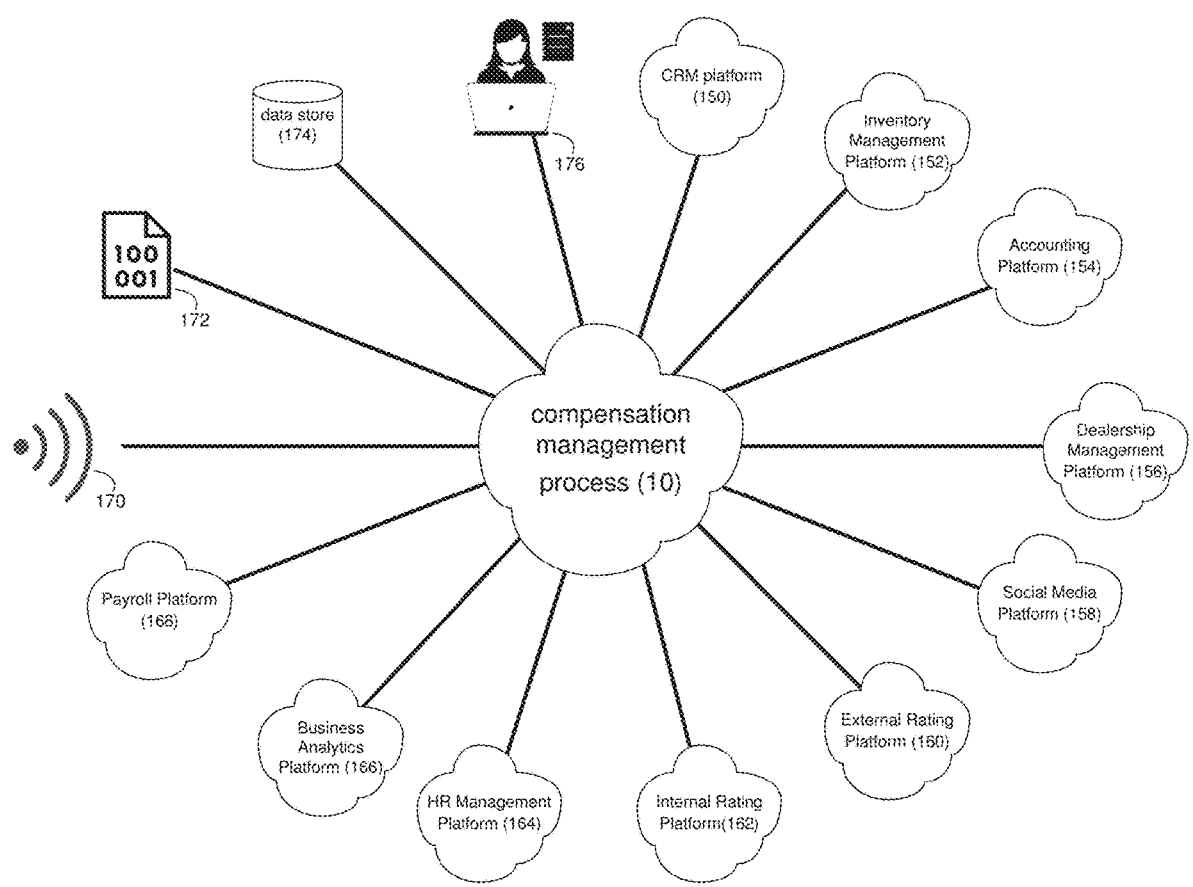
FIG. 2 is a diagrammatic view of the compensation management process of FIG. 1 interfaced with a plurality of external systems according to an embodiment of the present disclosure.

Referring also to FIG. 2, compensation management process 10 may be configured to interface with and/or interact with one or more external business entities, examples of which may include but are not limited to customer relationship management platform 150, inventory management platform 152, accounting platform 154, dealership management platform 156, social media platform 158, external rating platform 160, internal rating platform 162, human resource management platform 164, business analytics platform 166 and/or payroll platform 168.

As will be discussed below in greater detail, the performance of performance-based employees may be monitored and/or incentivized through the use of compensation management process 10.

Concepts 1-2

Figure 3:
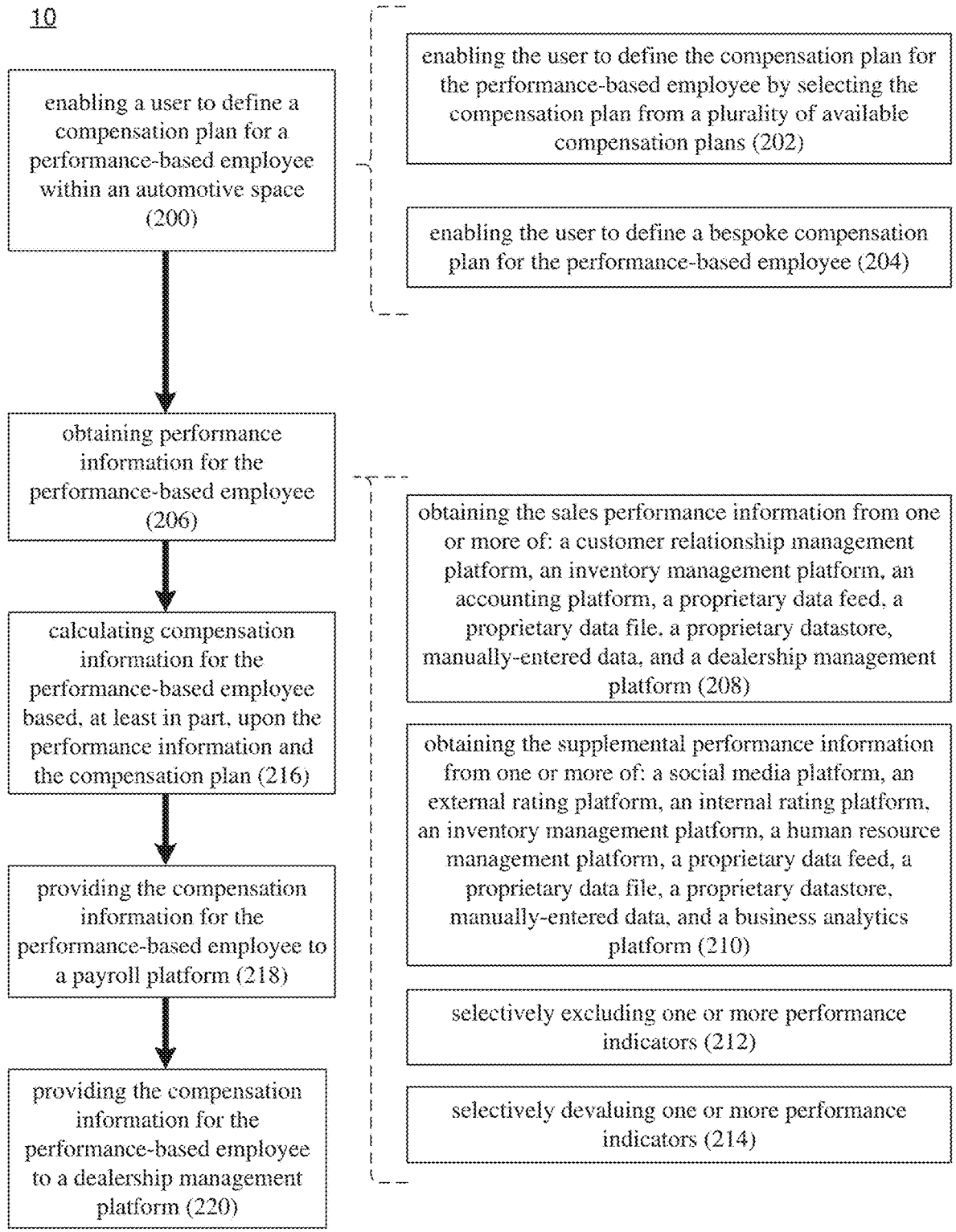
FIG. 3 is a flowchart of an implementation of the compensation management process of FIG. 1 according to an embodiment of the present disclosure.

Referring also to FIG. 3, compensation management process 10 may enable 200 a user (e.g., user 56) to define a compensation plan for a performance-based employee (e.g., one or more of users 36, 38, 40, 42). As discussed above, the performance-based employee (e.g., one or more of users 36, 38, 40, 42) may be a performance-based seller of products and/or services.

This performance-based employee may be a performance-based employee within one or more of: an automotive sales space; an automotive service space; an automotive body shop space; an automotive finance & insurance space; an automotive administrative space; an automotive franchisor space; an automotive parts space; a retail space; a healthcare space; a financial space; a manufacturing space; a hospitality space; a travel space; a pharmaceutical space; a technology space; and a real estate space.

For example, compensation management process 10 may enable 200 user 56) to define a compensation plan (e.g., compensation plan 58 or any of compensation plans 60) for one or more of users 36, 38, 40, 42, wherein users 36, 38, 40, 42 may be performance-based employees within an automotive space (e.g., car dealership 62). In this particular example, user 56 may be the sales manager of car dealership 62.

When enabling 200 a user (e.g., user 56) to define a compensation plan for a performance-based employee (e.g., one or more of users 36, 38, 40, 42), compensation management process 10 may enable 202 the user (e.g., user 56) to define the compensation plan for the performance-based employee one or more of users 36, 38, 40, 42) by selecting the compensation plan from a plurality of available compensation plans. For example, assume that compensation plans 60 include a plurality of compensation plans that are available at car dealership 62. Accordingly and when onboarding a salesperson (e.g. user 36), user 56 may define a compensation plan for user 36 by selecting a specific plan from plurality of compensation plans 60.

However, the selection of a compensation plan need not be so "cookie-cutter", wherein an existing compensation plan must be selected for a particular user. For example and when enabling 200 a user (e.g., user 56) to define a compensation plan for the performance-based employee (e.g., one or more of users 36, 38, 40, 42), compensation management process 10 may enable 204 the user (e.g., user 56) to define a bespoke compensation plan for the performance-based employee (e.g., one or more of users 36, 38, 40, 42). Therefore and through compensation management process 10, user 56 may be able to define a bespoke (i.e. custom) compensation plan for (in this example) user 36. By enabling 204 the user (e.g., user 56) to define a bespoke compensation plan for the performance-based employee (e.g., user 36), custom compensation plans may be defined via compensation management process 10 to e.g., entice a new salesperson to join car dealership 62 or address issues with an existing compensation plan of a specific salesperson.

Assume for this illustrative example that compensation plan 58 was defined for the performance-based employee (e.g., user 36), wherein future earnings of user 36 may be defined (i.e. calculated) based upon (in this example) compensation plan 58. Compensation management process 10 may obtain 206 performance information (e.g., performance information 64) for the performance-based employee (e.g., user 36) so that the compensation of user 36 may be calculated.

Performance information 64 may include sales performance information 66. Examples of sales performance information 66 may include but is not limited to: a quantity of units sold indicator, a date of units sold indicator, a cost of units sold indicator, a margin of units sold indicator, an incentive concerning units sold indicator, a type of units sold indicator and a timing of units sold indicator.

When obtaining 206 performance information 64 for the performance-based employee (e.g., user 36), compensation management process 10 may obtain 208 sales performance information 66 from one or more of: customer relationship management (CRM) platform 150 (e.g., a platform that enables a user/business to manage their relationship with actual and potential clients), inventory management platform 152 (e.g., a platform that enables a user/business to manage/order/sell their inventory), accounting platform 154 (e.g., a platform that enables a user/business to maintain their finances), proprietary data feed 170 (e.g., such as an internal sales data feed within car dealership 62), proprietary data file 172 (e.g., such as an internal sales data file within car dealership 62), proprietary datastore 174, manually-entered data 176, and dealership management platform 156.

Additionally, performance information 64 may include supplemental performance information 68. Examples of supplemental performance information 68 may include but is not limited to: an inventory age indicator; a minimum wage indicator; an hours worked indicator; an employment history indicator; a customer feedback indicator; an economic indicator; a team rating indicator; an individual rating indicator; and an organization rating indicator.

Accordingly, when obtaining 206 performance information 64 for the performance-based employee (e.g., user 36), compensation management process 10 may obtain 210 the supplemental performance information 68 from one or more of: social media platform 158, external rating platform 160, internal rating platform 162, inventory management platform 152, human resource management platform 164, proprietary data feed 170, proprietary data file 172, proprietary datastore 174, manually-entered data 176, and business analytics platform 166.

When obtaining 206 performance information 64 for the performance-based employee (e.g., user 36), compensation management process 10 may selectively exclude 212 one or more performance indicators; and/or selectively devalue 214 one or more performance indicators.

As discussed above, performance information 64 may include multiple discrete performance indicators, examples of which may include but are not limited to: a quantity of units sold indicator, a date of units sold indicator, a cost of units sold indicator, a margin of units sold indicator, an incentive concerning units sold indicator, a type of units sold indicator and a timing of units sold indicator (within e.g., sales performance information 66) and an inventory age indicator; a minimum wage indicator; an hours worked indicator; an employment history indicator; a customer feedback indicator; an economic indicator; a team rating indicator; an individual rating indicator; and an organization rating indicator (within e.g., supplemental performance information 68). Accordingly, compensation management process 10 may allow a user (e.g., user 56) to selectively exclude 212 one or more performance indicators; and/or selectively devalue 214 one or more performance indicators.

For example, assume that one of these performance indicators indicated that user 36 sold a vehicle on the last day of a sales event. That performance indicator would be included in performance information 64 that is used to calculate the compensation of user 36. However, assume for illustrative purposes that this particular vehicle was returned the following day (i.e. the day after the sales event ended). Accordingly and if this particular performance indicator was used to calculate the compensation of user 36, user 36 may be overcompensated (as e.g., the sale of this particular vehicle was the sale that qualified user 36 for a sales event bonus). Accordingly, compensation management process 10 may allow user 56 to selectively exclude 212 this particular performance indicator (thus eliminating the overcompensation of user 36); and/or selectively devalue 214 this particular performance indicator (thus mitigating the overcompensation of user 36).

Compensation management process 10 may calculate 216 compensation information (e.g., compensation information 70) for the performance-based employee (e.g., user 36) based, at least in part, upon the performance information 64 (which may include e.g., sales performance information 66 and/or supplemental performance information 68) and the compensation plan (e.g., compensation plan 56). For example, compensation plan 56 may define that user 36 receives X % of the net revenue of the first 10 vehicles they sell in a month and Y % of the net revenue of all other vehicles they sell in that month. Additionally, programs and financial incentives made be defined for e.g., selling certain makes of vehicles, certain models of vehicles, certain option packages, certain add-on packages, certain maintenance packages and certain warranty packages. Additionally, the compensation of user 36 may be impacted by e.g., reviews by management, reviews posted on social media, general feedback concerning user 36 and general feedback concerning dealership 62.

Once this compensation information (e.g., compensation information 70) is calculated 216, compensation management process 10 may provide 218 the compensation information (e.g., compensation formation 70) for the performance-based employee (e.g., user 36) to payroll platform 168 (so that e.g., user 36 may be compensated based, at least in part, upon compensation information 70).

Additionally and once this compensation information (e.g., compensation information 70) is calculated 216, compensation management process 10 may provide 220 the compensation information (e.g., compensation information 70) for the performance-based employee (e.g., user 36) to dealership management platform 156 (so that e.g., the performance and/or compensation of user 36 may be tracked by car dealership 62).

Concept #3

Referring also to FIG. 4, compensation management process 10 may include a plurality of compensation plans (e.g., compensation plans 60) that may be defined for one or more of users 36, 38, 40, 42. Assume for this example that user 56 (e.g. the sales manager for car dealership 62) is planning on implementing a new compensation plan at car dealership 62 but is unsure as to which one should be implemented. For example, it is foreseeable that one compensation plan may result in salespeople being under compensated (thus resulting in e.g., unhappy salespeople that may leave car dealership 62); while another compensation plan may result in salespeople being overly compensated (thus resulting in e.g., happy salespeople but an unprofitable car dealership). Accordingly and when considering switching compensation plans, it may be desirable for user 56 to see how a potential compensation plan may impact payroll and/or profitability of (in this example) car dealership 62.

Compensation management process 10 may enable 300 a user (e.g., user 56) to define a first compensation plan (e.g., compensation plan 72) for one or more performance-based employees (e.g., users 36, 38, 40, 42) within an automotive space. As discussed above, these performance-based employees (e.g., one or more of users 36, 38, 40, 42) may be performance-based sellers of products and/or services. Further and as discussed above, the automotive space may include one or more of: an automotive sales space; an automotive service space; an automotive body shop space; an automotive finance & insurance space; an automotive administrative space; an automotive franchisor space; and an automotive parts space.

When enabling 300 a user (e.g., user 56) to define a first compensation plan (e.g., compensation plan 72) for one or more performance-based employees (e.g., users 36, 38, 40, 42), compensation management process 10 may enable 302 the user (e.g., user 56) to define the first compensation plan (e.g., compensation plan 72) for one or more performance-based employees e.g., users 36, 38, 40, 42) by selecting the first compensation plan (e.g., compensation plan 72) from a plurality of available compensation plans (e.g., compensation plans 60).

Alternatively and when enabling 300 a user (e.g., user 56) to define a first compensation plan (e.g., compensation plan 72) for one or more performance-based employees (e.g., users 36, 38, 40, 42), compensation management process 10 may enable 304 the user (e.g., user 56) to define a bespoke first compensation plan (e.g., compensation plan 72') for the one or more performance-based employees (e.g., users 36, 38, 40, 42).

Compensation management process 10 may enable 306 the user (e.g., user 56) to define a second compensation plan (e.g., compensation plan 74) for the one or more performance-based employees (e.g., users 36, 38, 40, 42) within the automotive space.

When enabling 306 a user (e.g., user 56) to define a second compensation plan (e.g., compensation plan 74) for one or more performance-based employees (e.g., users 36, 38, 40, 42), compensation management process 10 may enable 308 the user (e.g., user 56) to define the second compensation plan (e.g., compensation plan 74) for one or more performance-based employees (e.g., users 36, 38, 40, 42) by selecting the second compensation plan (e.g., compensation plan 74) from a plurality of available compensation plans (e.g., compensation plans 60).

Alternatively and when enabling 306 a user (e.g., user 56) to define a second compensation plan (e.g., compensation plan 74) for one or more performance-based employees (e.g., users 36, 38, 40, 42), compensation management process 10 may enable 310 the user (e.g., user 56) to define a bespoke second compensation plan (e.g., compensation plan 74') for the one or more performance-based employees (e.g., users 36, 38, 40, 42).

Compensation management process 10 may compare 312 the first compensation plan (e.g., compensation plan 72/72') to the second compensation plan (e.g., compensation plan 74, 74') to determine one or more differential characteristics for the second compensation plan (e.g., compensation plan 74, 74') with respect to the first compensation plan (e.g., compensation plan 72/72').

As discussed above, it is foreseeable that one compensation plan (e.g., compensation plan 72/72') may result in salespeople being under compensated (thus resulting in e.g., unhappy salespeople that may leave car dealership 62); while another compensation plan (e.g., compensation plan 72/72') may result in salespeople being overly compensated (thus resulting in e.g., happy salespeople but car dealership 62 being unprofitable). Accordingly and when considering switching compensation plans, it may be desirable for user 56 to see how a potential compensation plan may impact payroll and/or profitability of (in this example) car dealership 62. Accordingly and by examining the above-described differential characteristics, user 56 may be able to determine which compensation plan (e.g., compensation plan 72/72' or compensation plan 74/74') is the more desirable choice.

When comparing 312 the first compensation plan (e.g., compensation plan 72/72') and the second compensation plan (e.g., compensation plan 74, 74') to determine one or more differential characteristics for the second compensation plan (e.g., compensation plan 74, 74') with respect to the first compensation plan (e.g., compensation plan 72/72'), compensation management process 10 may utilize 314 historical performance information of the one or more performance-based employees (e.g., users 36, 38, 40, 42) to determine the one or more differential characteristics for the second compensation plan (e.g., compensation plan 74, 74') with respect to the first compensation plan (e.g., compensation plan 72/72'). Examples of such historical performance information may include but are not limited to historical sales performance information and/or historical supplemental performance information.

When comparing 312 the first compensation plan (e.g., compensation plan 72/72') and the second compensation plan (e.g., compensation plan 74, 74') to determine one or more differential characteristics for the second compensation plan (e.g., compensation plan 74, 74') with respect to the first compensation plan (e.g., compensation plan 72/72'), compensation management process 10 may utilize 316 predicted performance information of the one or more performance-based employees (e.g., users 36, 38, 40, 42) to determine the one or more differential characteristics for the second compensation plan (e.g., compensation plan 74, 74') with respect to the first compensation plan (e.g., compensation plan 72/72'). Examples of such predicted performance information may include but are not limited to predicted sales performance information and/or predicted supplemental performance information.

As discussed above, this sales performance information 66 may include but is not limited to: a quantity of units sold indicator, a date of units sold indicator, a cost of units sold indicator, a margin of units sold indicator, an incentive concerning units sold indicator, a type of units sold indicator and a timing of units sold indicator. Accordingly, historical sales performance information may define the manner in which the performance-based employee (e.g., user 36, 38, 40, 42) has performed with respect to sales in the past, while predicted sales performance information may define the manner in which the performance-based employee (e.g., user 36, 38, 40, 42) will likely perform with respect to sales in the future.

As discussed above, this supplemental performance information 68 may include one or more of: an inventory age indicator; a minimum wage indicator; an hours worked indicator; an employment history indicator; a customer feedback indicator; an economic indicator; a team rating indicator; an individual rating indicator; and an organization rating indicator. Accordingly, historical supplemental performance information may define the manner in which the performance-based employee (e.g., user 36, 38, 40, 42) has performed with respect to supplemental metrics in the past, while predicted supplemental performance information may define the manner in which the performance-based employee (e.g., user 36, 38, 40, 42) will likely perform with respect to supplemental metrics in the future.

When comparing 312 the first compensation plan (e.g., compensation plan 72/72') and the second compensation plan (e.g., compensation plan 74, 74') to determine one or more differential characteristics for the second compensation plan (e.g., compensation plan 74, 74') with respect to the first compensation plan (e.g., compensation plan 72/72'), compensation management process 10 may distribute 318 the one or more differential characteristics with respect to a plurality of performance information indicators.

For example, assume that when comparing 312 the first compensation plan (e.g., compensation plan 72/72') and the second compensation plan (e.g., compensation plan 74, 74') to determine one or more differential characteristics for the second compensation plan (e.g., compensation plan 74, 74') with respect to the first compensation plan (e.g., compensation plan 72/72'), compensation management process 10 may determine that the monthly operating costs for car dealership 62 may decrease by $12,000 per month if car dealership 62 switches to the second compensation plan (e.g., compensation plan 74, 74') from the first compensation plan (e.g., compensation plan 72/72').

In order to aid in the analysis and the explanation, compensation management process 10 may distribute 318 these one or more differential characteristics (e.g., the $12,000 per month reduction in operating costs) with respect to a plurality of performance information indicators. For example, compensation management process 10 may determine that this $12,000 monthly reduction in the operating costs of car dealership 62 may be the cumulative result of several discrete performance information indicators (e.g., such as the sum of a $20,000 increase in salaries, a $10,000 increase in 401(k) contributions, and a $42,000 reduction in benefit expenses).

Concept #4

Figure 5:
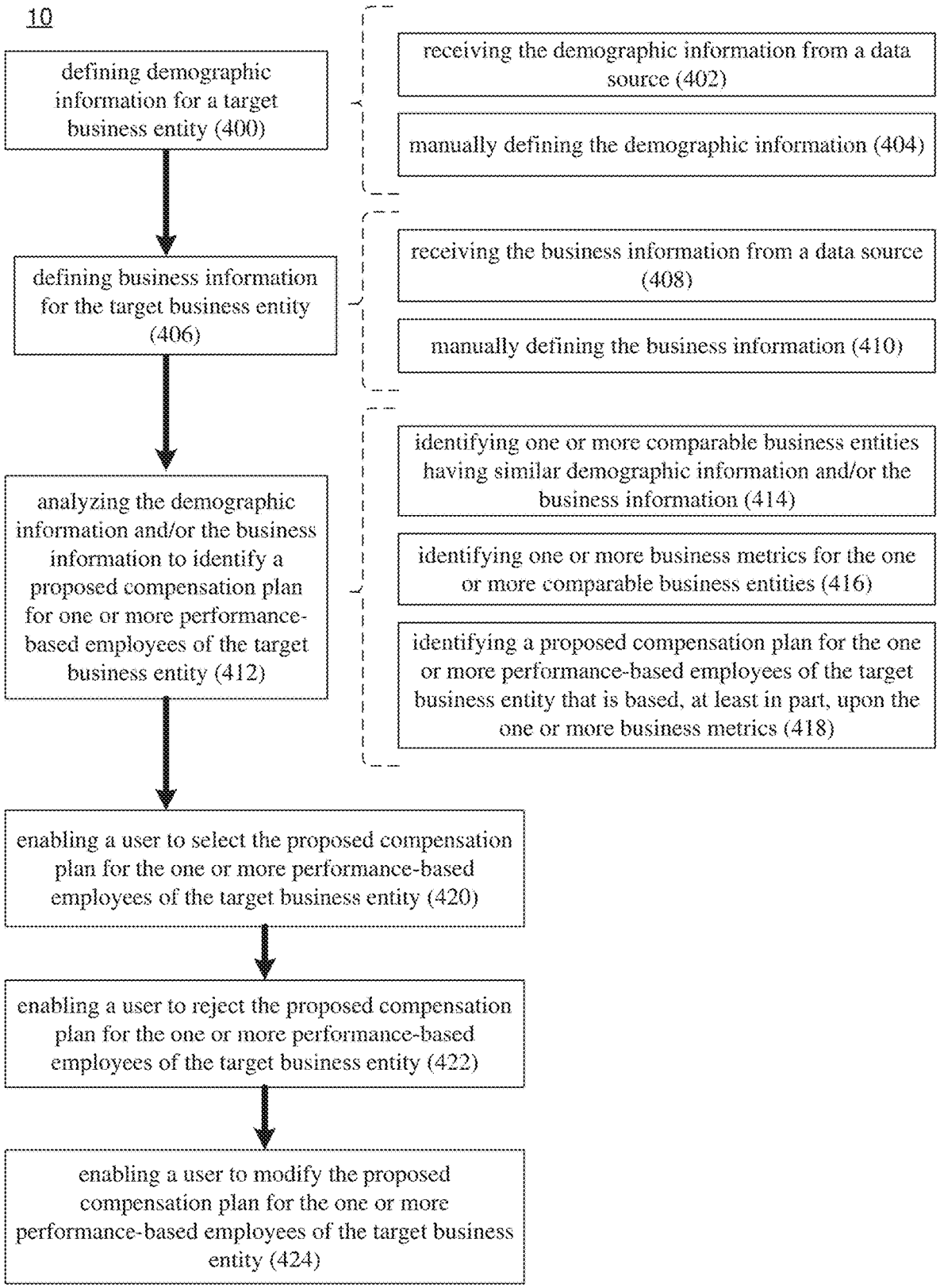
FIG. 5 is a flowchart of an implementation of the compensation management process of FIG. 1 according to an embodiment of the present disclosure.

Referring also to FIG. 5, compensation management process 10 may be configured to allow user (e.g. user 56) to define a compensation plan for e.g., car dealership 62 that is competitive with other car dealerships (e.g., car dealership 76) similarly situated with respect to car dealership 62.

For example, compensation management process 10 may define 400 demographic information (e.g., demographic information 78) for a target business entity (e.g., car dealership 62). As is known, demographic information is information on a certain portion of the population that is based on various factors, examples of which may include but are not limited to age, race, gender, employment status, education, income levels, marital status, birthrates, and death rates. Accordingly, demographic information 78 may be information concerning the population surrounding (or clientele of) car dealership 68.

As discussed above, the target business entity (e.g., car dealership 62) may be a business entity in the automotive space, wherein the automotive space may include one or more of: an automotive sales space; an automotive service space; an automotive body shop space; an automotive finance & insurance space; an automotive administrative space; an automotive franchisor space; and an automotive parts space.

When defining 400 demographic information 78 for a target business entity (e.g., car dealership 62), compensation management process 10 may receive 402 demographic information 78 from a data source (e.g., data source 80). An example of data source 80 may be a data source that is external to car dealership 62, such as a census database.

Alternatively and when defining 400 demographic information 78 for a target business entity (e.g., car dealership 62), compensation management process 10 may manually define 404 demographic information 78. For example, if demographic information 78 does not pre-exist (or is only available via printed documentation), compensation management process 10 may enable a user 56) to manually define 404 demographic information 78.

Compensation management process 10 may define 406 business information (e.g., business information 82) for the target business entity (e.g., car dealership 62). As is known, business information 82 may be any type of information that is useful when making business decisions, examples of which may include but are not limited to entity status, entity size, gross revenue, number of employees, years in business, type of business, tax status, and social standing.

When defining 406 business information. 82 for the target business entity (e.g., car dealership 62), compensation management process 10 may receive 408 business information 82 from a data source (e.g., data source 80). An example of data source 80 may be a data source that is external to car dealership 62, such as a business intelligence database.

When defining 406 business information 82 for the target business entity (e.g., car dealership 62), compensation management process 10 may manually define 410 business information 82. For example, if business information 82 does not pre-exist (or is only available via printed documentation), compensation management process 10 may enable a user (e.g., user 56) to manually define 404 business information 82.

Compensation management process 10 may analyze 412 demographic information 78 and/or business information 82 to identify a proposed compensation plan (e.g., compensation plan 58) for one or more performance-based employees (e.g., users 36, 38, 40, 42) of the target business entity (e.g., car dealership 62). As discussed above, the performance-based employees (e.g., users 36, 38, 40, 42) may be a performance-based seller of products and/or services. Accordingly and as will be discussed below in greater detail, compensation management process 10 may allow user 56 to identify a compensation plan that is equivalent to (or better than) the compensation plans offered by their competitors (e.g. car dealership 76).

Specifically and when analyzing 412 demographic information 78 and/or business information 82 to identify a proposed compensation plan (e.g., compensation plan 58) for one or more performance-based employees users 36, 38, 40, 42) of the target business entity (e.g., car dealership 62), compensation management process 10 may identify 414 one or more comparable business entities (e.g., car dealership 76) having similar demographic information and/or the business information (e.g., demographic information similar to demographic information 78 and/or business information similar to business information 82). By identifying 414 one or more comparable business entities (e.g., car dealership 76), compensation management process 10 may allow user 56 to identify who their competition is, where this determination may be based upon demographic information 78 and/or business information 82. For example, demographic information 78 may identify other car dealerships that have similarly-situated clientele. For example, the people that buy Lamborghinis tend to be different financially from those who by Kias. Further, the people that live on the Upper East Side of Manhattan tend to be different financially from those who live in a rural farming community. Additionally, such differences may be based on the type of car dealership. For example, salespeople who work at a high-end European car dealership may be better compensated then salespeople that work at a non-franchised used car dealership.

Compensation management process 10 may also identify 416 one or more business metrics (e.g., business metrics 84) the one or more comparable business entities (e.g., car dealership 76). Once compensation management process 10 identifies 414 one or more comparable business entities (e.g., car dealership 76), compensation management process 10 may identify 416 business metrics (e.g., business metrics 84) for these identified comparable business entities (e.g., car dealership 76).

Examples of such business metrics (e business metrics 84) may include but are not limited to: industry benchmarks; compensation as a percentage of profit; compensation as a percentage of overall sales; compensation per unit sold; quantity of units sold; hours worked; average units sold per employee; compensation per hour sold; compensation as a percentage of overall hours worked; average gross profit per unit sold; average gross profit per hour sold; and employees as a percentage of overall sales.

Once compensation management process 10 identifies 414 the comparable business entities (e.g. car dealership 76) and identifies 416 the related business metrics (e.g., business metrics 84), compensation management process 10 may identify 418 a proposed compensation plan (e.g., compensation plan 58) for the one or more performance-based employees (e.g., users 36, 38, 40, 42) of the target business entity (e.g., car dealership 62) that is based, at least in part, upon the one or more business metrics (e.g., business metrics 84) for the comparable business entity (e.g., car dealership 76). Accordingly and through the use of compensation management process 10, user 56 may be able to identify a compensation plan (e.g., compensation plan 58) that allows them to be competitive with comparable business entities (e.g., car dealership 76), thus avoiding situations in which the compensation plan offered by car dealership 62 is under-generous (thus inhibiting the ability of car dealership 62 to attract the best salespeople) and/or over generous (thus avoiding car dealership 62 being less profitable).

In the event that user 56 is satisfied with compensation plan 58, compensation management process 10 may enable 420 a user (e.g. user 56) to select the proposed compensation plan (e.g., compensation plan 58) for the one or more performance-based employees (e.g., users 36, 38, 40, 42) of the target business entity (e.g., car dealership 62).

In the event that user 56 is not satisfied with compensation plan 58, compensation management process 10 may enable 422 a user (e.g. user 56) to reject the proposed compensation plan (e.g., compensation plan 58) for the one or more performance-based employees (e.g., users 36, 38, 40, 42) of the target business entity (e.g., car dealership 62).

In the event that user 56 is partially satisfied with compensation plan 58, compensation management process 10 may enable 424 a user (e.g. user 56) to modify the proposed compensation plan (e.g., compensation plan 58) for the one or more performance-based employees (e.g., users 36, 38, 40, 42) of the target business entity (e.g., car dealership 62).

Concept #5

Figure 6:
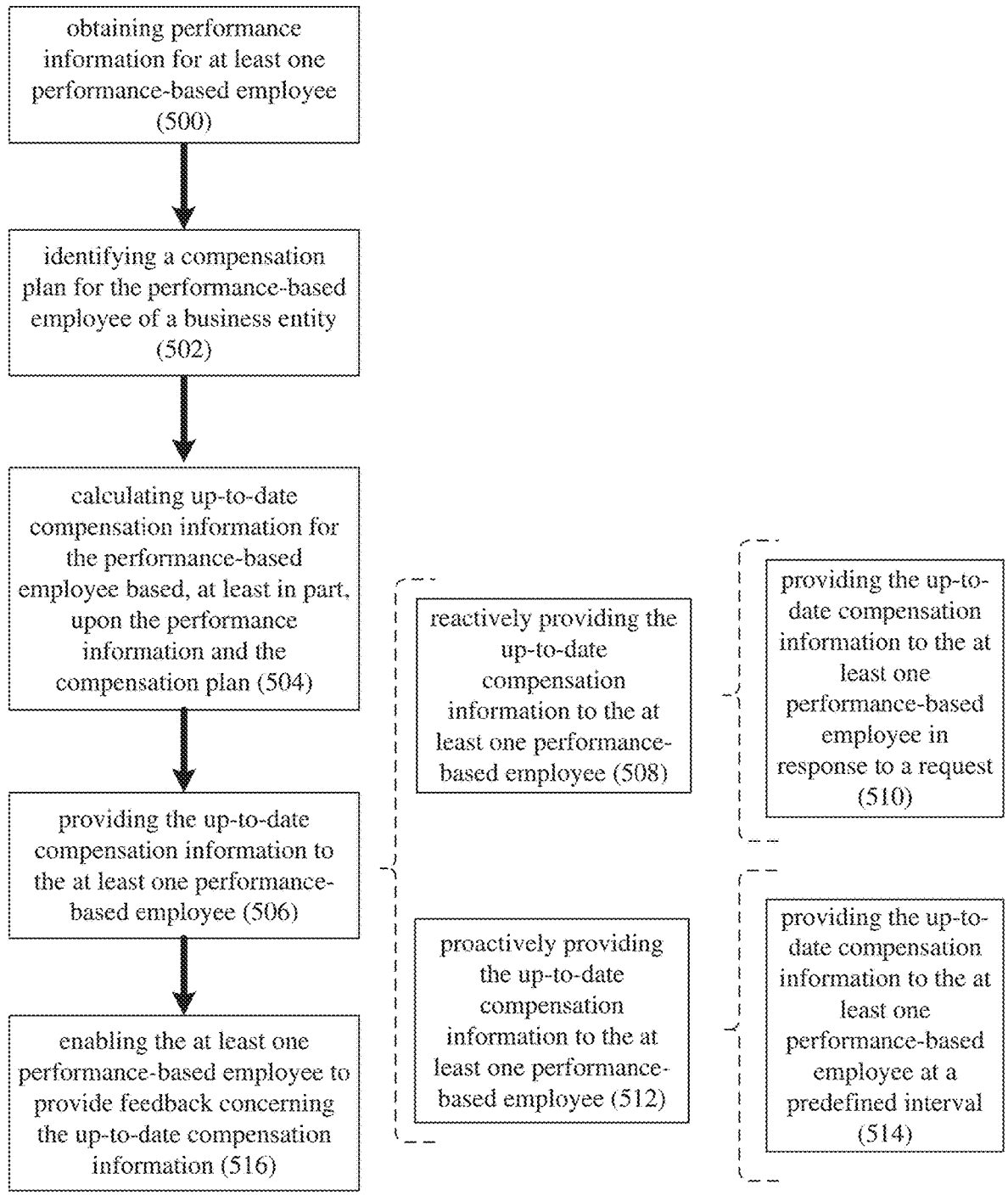
FIG. 6 is a flowchart of an implementation of the compensation management process of FIG. 1 according to an embodiment of the present disclosure.

Referring also to FIG. 6, compensation management process 10 may be configured to allow a user (e.g., user 56 and/or a performance-based employee, such as user 36, 38, 40, 42) to obtain up-to-date compensation information for a performance-based employee (e.g., user 36, 38, 40, 42).

Accordingly, compensation management process 10 may obtain 500 performance information (e.g., performance information 64) for at least one performance-based employee (e.g., users 36, 38, 40, 42). As discussed above, these performance-based employees (e.g., users 36, 38, 40, 42) may be a performance-based sellers of products and/or services.

The performance information (e.g., performance information 64) obtained 500 may include sales performance information (e.g., sales performance information 66), wherein this sales performance information (e.g., sales performance information 66) may include but is not limited to: a quantity of units sold indicator, a date of units sold indicator, a cost of units sold indicator, a margin of units sold indicator, an incentive concerning units sold indicator, a type of units sold indicator and a timing of units sold indicator.

This sales performance information (e.g., sales performance information 66) may be obtained from one or more of: customer relationship management (CRM) platform 150 (e.g., a platform that enables a user/business to manage their relationship with actual and potential clients), inventory management platform 152 (e.g., a platform that enables a user/business to manage/order/sell their inventory), accounting platform 154 (e.g., a platform that enables a user/business to maintain their finances), proprietary data feed 170 (e.g., such as an internal sales data feed within car dealership 62), proprietary data file 172 (e.g., such as an internal sales data file within car dealership 62), proprietary datastore 174, manually-entered data 176, and dealership management platform 156.

Additionally, the performance information (e.g., performance information 64) obtained 500 may include supplemental performance information (e.g., supplemental performance information 68), wherein this supplemental performance information (e.g., supplemental performance information 68) may include one or more of: an inventory age indicator; a minimum wage indicator; an hours worked indicator; an employment history indicator; a customer feedback indicator; an economic indicator; a team rating indicator; an individual rating indicator; and an organization rating indicator.

This supplemental performance information (e.g., supplemental performance information 68) may be obtained from one or more of: social media platform 158, external rating platform 160, internal rating platform 162, inventory management platform 152, human resource management platform 164, proprietary data feed 170, proprietary data file 172, proprietary datastore 174, manually-entered data 176, and business analytics platform 166.

Compensation management process 10 may then identify 502 a compensation plan (e.g., compensation plan 58) for the performance-based employee (e.g., users 36, 38, 40, 42) of a business entity (e.g., car dealership 62). As discussed above, this business entity (e.g., car dealership 62) may be a business entity in the automotive space, wherein the automotive space may include one or more of: an automotive sales space; an automotive service space; an automotive body shop space; an automotive finance & insurance space; an automotive administrative space; an automotive franchisor space; and an automotive parts space.

Compensation management process 10 may then calculate 504 up-to-date compensation information (e.g., compensation information 70) for the performance-based employee (e.g., users 36, 38, 40, 42) based, at least in part, upon the performance information (e.g., compensation information 70) and the compensation plan (e.g., compensation plan 58).

Compensation management process 10 may provide 506 the up-to-date compensation information (e.g., compensation information 70) to the at least one performance-based employee (e.g., users 36, 38, 40, 42). The up-to-date compensation information (e.g., compensation information 70) may include compensation information (e.g., compensation information 70) that is current at the time that the up-to-date compensation information (e.g., compensation information 70) is provided to the at least one performance-based employee (e.g., users 36, 38, 40, 42).

Accordingly, compensation management process 10 may enable a performance-based employee (e.g., user 36, 38, 40, 42) to obtain up-to-date compensation information (e.g., compensation information 70). Therefore, at any point during a pay cycle (e.g., mid-day, mid-week, mid-month), a performance-based employee (e.g., user 36, 38, 40, 42) may utilize compensation management process 10 to obtain up-to-date compensation information (e.g., compensation information 70) so that they may determine how they are performing (compensation wise).

When providing 506 the up-to-date compensation information (e.g., compensation information 70) to the at least one performance-based employee (e.g., users 36, 38, 40, 42), compensation management process 10 may reactively provide 508 the up-to-date compensation information (e.g., compensation information 70) to the at least one performance-based employee (e.g., users 36, 38, 40, 42). When reactively providing 508 the up-to-date compensation information (e.g., compensation information 70) to the at least one performance-based employee (e.g., users 36, 38, 40, 42), compensation management process 10 may provide 510 the up-to-date compensation information (e.g., compensation information 70) to the at least one performance-based employee (e.g., users 36, 38, 40, 42) in response to a request (e.g. request 86). Accordingly, compensation management process 10 may be configured to only provide 506 this up-to-date compensation information (e.g., compensation information 70) in response to a request (e.g. request 86) submitted by the user (e.g., user 36, 38, 40, 42).

When providing 506 the up-to-date compensation information (e.g., compensation information 70) to the at least one performance-based employee (e.g., users 36, 38, 40, 42), compensation management process 10 may proactively provide 512 the up-to-date compensation information (e.g., compensation information 70) to the at least one performance-based employee (e.g., users 36, 38, 40, 42). When proactively providing 512 the up-to-date compensation information (e.g., compensation information 70) to the at least one performance-based employee (e.g., users 36, 38, 40, 42), compensation management process 10 may provide 514 the up-to-date compensation information (e.g., compensation information 70) to the at least one performance-based employee (e.g., users 36, 38, 40, 42) at a predefined interval.

Accordingly, compensation management process 10 may be configured to automatically provide 506 this up-to-date compensation information (e.g., compensation information 70) to the user (e.g., user 36, 38, 40, 42) at a regular frequency (e.g., daily, weekly, monthly).

Once this up-to-date compensation information (e.g., compensation information 70) is received by the performance-based employee (e.g., user 36, 38, 40, 42), the performance-based employee (e.g., user 36, user 38, user 40, user 42) may review the same for accuracy and/or to identify issues within the same. Compensation management process 10 may enable 516 the at least one performance-based employee (e.g., users 36, 38, 40, 42) to provide feedback (e.g., feedback 88) concerning the up-to-date compensation information (e.g., compensation information 70). Examples of feedback 88 may include but are not limited to: the performance-based employee (e.g., user 36, 38, 40, 42) affirming the accuracy of the up-to-date compensation information (e.g., compensation information 70); the performance-based employee (e.g., user 36, 38, 40, 42) contesting the accuracy of the up-to-date compensation information (e.g., compensation information 70); and the performance-based employee (e.g., user 36, 38, 40, 42) identifying a discrepancy within the up-to-date compensation information (e.g., compensation information 70).

Concept #6

Figure 7:
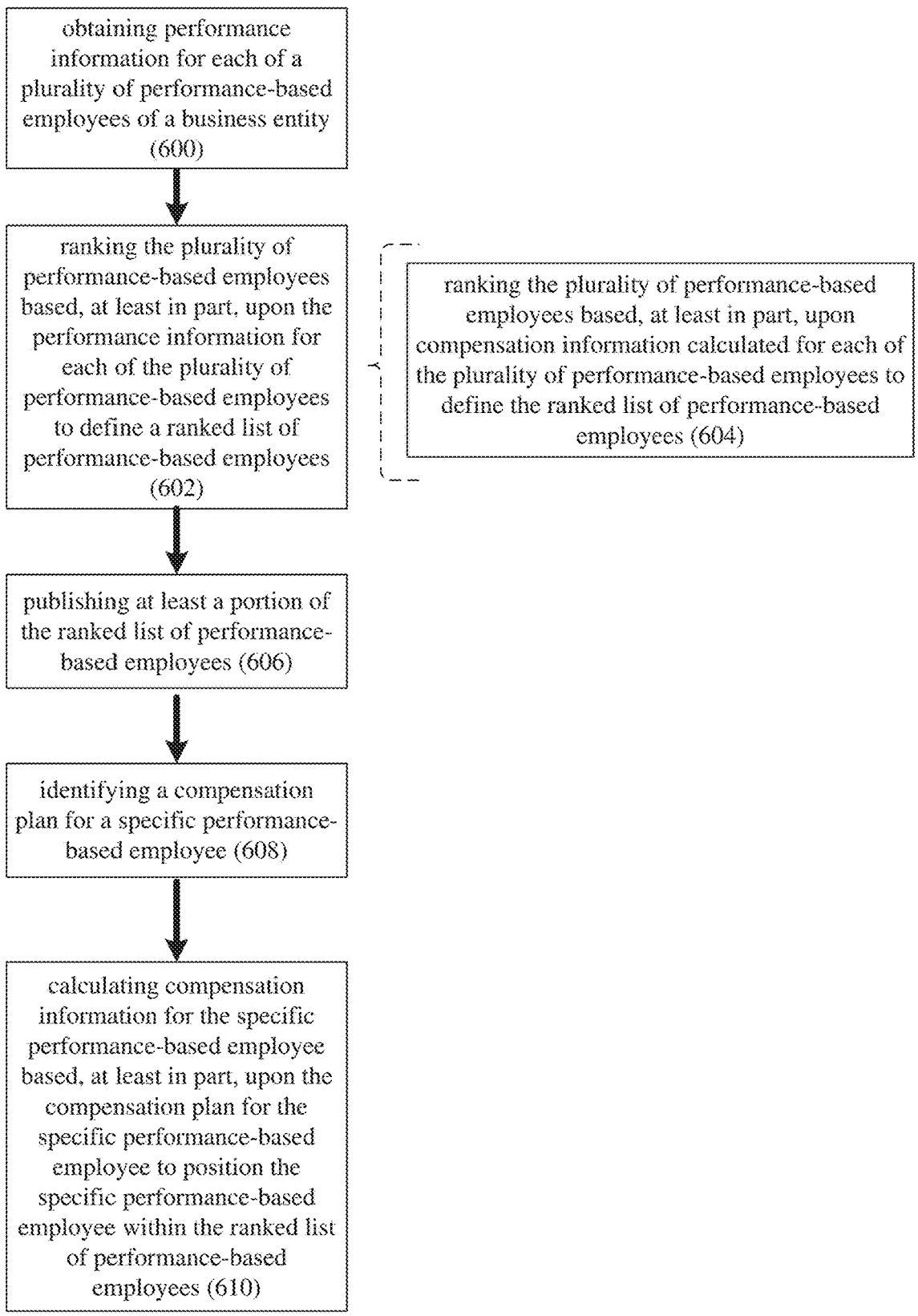
FIG. 7 is a flowchart of an implementation of the compensation management process of FIG. 1 according to an embodiment of the present disclosure.

Referring also to FIG. 7, compensation management process 10 may obtain 600 performance information (e.g., performance information 64) for each of a plurality of performance-based employees (e.g., users 36, 38, 40, 42) of a business entity (e.g., car dealership 62). As discussed above, these performance-based employees (e.g., users 36, 38, 40, 42) may be a performance-based sellers of products and/or services.

As discussed above, this business entity (e.g., car dealership 62) may be a business entity in the automotive space, wherein this automotive space may include one or more of: an automotive sales space; an automotive service space; an automotive body shop space; an automotive finance & insurance space; an automotive administrative space; an automotive franchisor space; and an automotive parts space.

The performance information (e.g., performance information 64) obtained 600 may include sales performance information (e.g., sales performance information 66), wherein this sales performance information (e.g., sales performance information 66) may include but is not limited to: a quantity of units sold indicator, a date of units sold indicator, a cost of units sold indicator, a margin of units sold indicator, an incentive concerning units sold indicator, a type of units sold indicator and a timing of units sold indicator.

This sales performance information (e.g., sales performance information 66) may be obtained from one or more of: customer relationship management (CRM) platform 150 (e.g., a platform that enables a user/business to manage their relationship with actual and potential clients), inventory management platform 152 (e.g., a platform that enables a user/business to manage/order/sell their inventory), accounting platform 154 (e.g., a platform that enables a user/business to maintain their finances), proprietary data feed 170 (e.g., such as an internal sales data feed within car dealership 62), proprietary data file 172 (e.g., such as an internal sales data file within car dealership 62), proprietary datastore 174, manually-entered data 176, and dealership management platform 156.

The performance information obtained 600 may include supplemental performance information (e.g., supplemental performance information 68), wherein this supplemental performance information (e.g., supplemental performance information 68) may include one or more of: an inventory age indicator; a minimum wage indicator; an hours worked indicator; an employment history indicator; a customer feedback indicator; an economic indicator; a team rating indicator; an individual rating indicator; and an organization rating indicator.

This supplemental performance information (e.g., supplemental performance information 68) may be obtained from one or more of: social media platform 158, external rating platform 160, internal rating platform 162, inventory management platform 152, human resource management platform 164, proprietary data feed 170, proprietary data file 172, proprietary datastore 174, manually-entered data 176, and business analytics platform 166.

Compensation management process 10 may rank 602 the plurality of performance-based employees (e.g., users 36, 38, 40, 42) based, at least in part, upon the performance information (e.g., performance information 64, which may include sales performance information 66 and/or supplemental performance information 68) for each of the plurality of performance-based employees (e.g., users 36, 38, 40, 42) to define a ranked list (e.g., ranked list 90) of performance-based employees.

When ranking 602 the plurality of performance-based employees (e.g., users 36, 38, 40, 42) based, at least in part, upon the performance information (e.g., performance information 64, which may include sales performance information 66 and/or supplemental performance information 68) for each of a plurality of performance-based employees (e.g., users 36, 38, 40, 42) to define a ranked list (e.g., ranked list 90) of performance-based employees, compensation management process 10 may rank 604 the plurality of performance-based employees (e.g., users 36, 38, 40, 42) based, at least in part, upon the compensation information (e.g., compensation information 70) calculated for each of the plurality of performance-based employees (e.g., users 36, 38, 40, 42) to define the ranked list (e.g., ranked list 90) of performance-based employees.

Compensation management process 10 may then publish 606 at least a portion of the ranked list (e.g., ranked list 90) of performance-based employees. Examples of publishing 606 at least a portion of the ranked list (e.g., ranked list 90) may include but are not limited to: rendering at least a portion of the ranked list (e.g., ranked list 90) on a display screen (not shown) accessible by compensation management process 10; including at least a portion of the ranked list (e.g., ranked list 90) within a publication (e.g., an email) produced by compensation management process 10; and/or including at least a portion of the ranked list (e.g., ranked list 90) within a webpage (not shown) published by compensation management process 10.

As discussed above, compensation management process 10 may rank 604 the plurality of performance-based employees (e.g., users 36, 38, 40, 42) based, at least in part, upon compensation information (e.g., compensation information 70) calculated for each of the plurality of performance-based employees (e.g., users 36, 38, 40, 42) to define the ranked list (e.g., ranked list 90) of performance-based employees. Accordingly and in order to effectuate the calculation of this compensation information (e.g., compensation information 70), compensation management process 10 may identify 608 a compensation plan (e.g., compensation plan 58) for a specific performance-based employee (e.g., each of users 36, 38, 40, 42). Compensation management process 10 may then calculate 610 the compensation information (e.g., compensation information 70) for the specific performance-based employee (e.g., each of users 36, 38, 40, 42) based, at least in part, upon the compensation plan (e.g., compensation plan 58) identified 604 for the specific performance-based employee (e.g., each of users 36, 38, 40, 42) to position the specific performance-based employee (e.g., each of users 36, 38, 40, 42) within the ranked list (e.g., ranked list 90) of performance-based employees.

Concept #7

Figure 8:
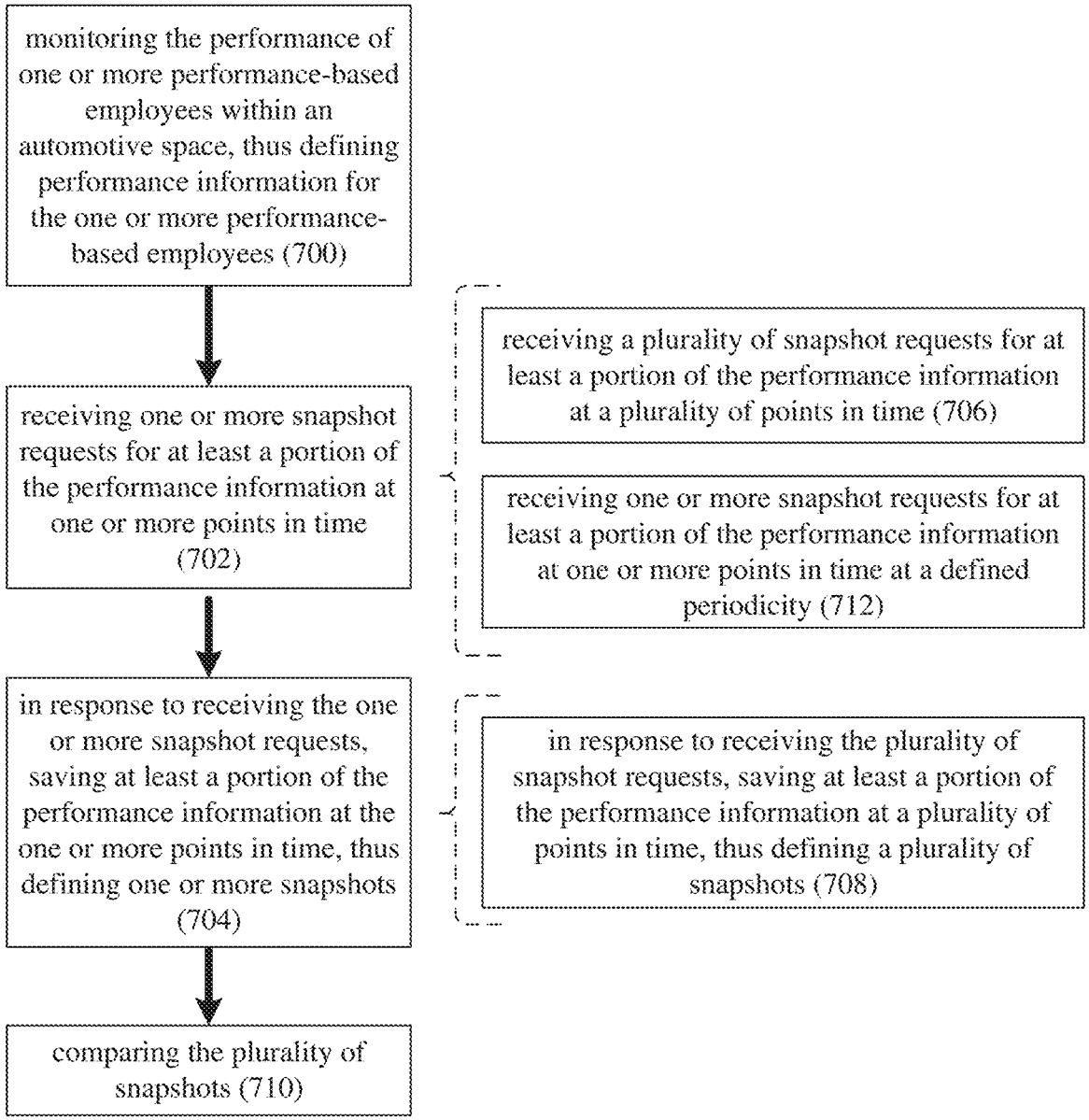
FIG. 8 is a flowchart of an implementation of the compensation management process of FIG. 1 according to an embodiment of the present disclosure.

Referring also to FIG. 8, compensation management process 10 may monitor 700 the performance of one or more performance-based employees (e.g., users 36, 38, 40, 42) within an automotive space, thus defining performance information (e.g., performance information 64) for the one or more performance-based employees (e.g., users 36, 38, 40, 42). As discussed above, the automotive space may include one or more of: an automotive sales space; an automotive service space; an automotive body shop space; an automotive finance & insurance space; an automotive administrative space; an automotive franchisor space; and an automotive parts space.

As discussed above, this performance information (e.g., performance information 64) may include sales performance information (e.g., sales performance information 66), wherein this sales performance information (e.g., sales performance information 66) may include but is not limited to: a quantity of units sold indicator, a date of units sold indicator, a cost of units sold indicator, a margin of units sold indicator, an incentive concerning units sold indicator, a type of units sold indicator and a timing of units sold indicator.

This sales performance information (e.g., sales performance information 66) may be obtained from one or more of: customer relationship management (CRM) platform 150 (e.g., a platform that enables a user/business to manage their relationship with actual and potential clients), inventory management platform 152 (e.g., a platform that enables a user/business to manage/order/sell their inventory), accounting platform 154 (e.g., a platform that enables a user/business to maintain their finances), proprietary data feed 170 (e.g., such as an internal sales data feed within car dealership 62), proprietary data file 172 (e.g., such as an internal sales data file within car dealership 62), proprietary datastore 174, manually-entered data 176, and dealership management platform 156.

Additionally, the performance information (e.g., performance information 64) may include supplemental performance information (e.g., supplemental performance information 68), wherein this supplemental performance information (e.g., supplemental performance information 68) may include one or more of: an inventory age indicator; a minimum wage indicator; an hours worked indicator; an employment history indicator; a customer feedback indicator; an economic indicator; a team rating indicator; an individual rating indicator; and an organization rating indicator.

This supplemental performance information (e.g., supplemental performance information 68) may be obtained from one or more of: social media platform 158, external rating platform 160, internal rating platform 162, inventory management platform 152, human resource management platform 164, proprietary data feed 170, proprietary data file 172, proprietary datastore 174, manually-entered data 176, and business analytics platform 166.

Compensation management process 10 may receive 702 one or more snapshot requests (e.g. request 86) for at least a portion of the performance information (e.g., performance information 64) at one or more points in time. These one or more snapshot requests (e.g. request 86) may be received 702 from a specific performance-based employee (e.g., user 36) included within the one or more performance-based employees (e.g., users 36, 38, 40, 42). Accordingly, the one or more performance-based employees (e.g., users 36, 38, 40, 42) may request snapshots for their personal information and/or bookkeeping purposes. Additionally/alternatively, the one or more snapshot requests (e.g. request 86) may be received 702 from a manager (e.g., user 56) of the one or more performance-based employees (e.g., users 36, 38, 40, 42). Accordingly, user 56 may request snapshots so that they may monitor the performance of the one or more performance-based employees (e.g., users 36, 38, 40, 42). Further, the me or more snapshot requests (e.g. request 86) may be received 702 from a department within an automotive space (e.g., the payroll department of car dealership 62). Accordingly, various departments within car dealership 62 may request snapshots so that they may e.g., gage the performance of the one or more performance-based employees (e.g., users 36, 38, 40, 42), process the payroll of the one or more performance-based employees (e.g., users 36, 38, 40, 42), or competitively rank the one or mare performance-based employees users 36, 38, 40, 42).

In response to receiving 702 the one or more snapshot requests request 86), compensation management process 10 may save 704 at least a portion of the performance information (e.g., performance information 64) at the one or more points in tune, thus defining one or more snapshots (e.g., snapshots 92). For example, if a snapshot is requested for user 36 on the last day of January, compensation management process 10 may save 704 at least a portion of the performance information (e.g., performance information 64) for user 36 as of the last day of January, wherein this saved portion of the performance information (e.g., performance information 64) may be included within and/or used to define a snapshot (e.g., one of snapshots 92) for user 36 as of the last day of January.

It is foreseeable, that a performance-based employee (e.g., user 36) may request a plurality of snapshots. Accordingly and when receiving 702 one or more snapshot requests (e.g. request 86) for at least a portion of the performance information (e.g., performance information 64) at one or more points in time, compensation management process 10 may receive 706 a plurality of snapshot requests (e.g. requests 94) for at least a portion of the performance information (e.g., performance information 64) at a plurality of points in time. Accordingly, assume that user 36 would like to receive a snapshot so that they could see how they were performing at the end of each of three months (e.g. January, February, March). Accordingly, user 36 may submit three snapshot requests (included within snapshot requests 94) that may be received 706 by compensation management process 10.

Accordingly and when saving 704 at least a portion of the performance information (e.g., performance information 64) at the one or more points in time, thus defining one or more snapshots in response to receiving the one or more snapshot requests (the three snapshot requests included within snapshot requests 94), compensation management process 10 may save 708 at least a portion of the performance information (e.g., performance information 64) at a plurality of points in time, thus defining a plurality of snapshots (within snapshots 92). For example, compensation management process 10 may save 708 at least a portion of the performance information (e.g., performance information 64) for user 36 as of the last day of January, the last day of February and the last day of March, wherein this saved portion of the performance information (e.g., performance information 64) may be included within and/or used to define a January snapshot, a February snapshot and a March snapshot for user 36 (e.g., all of which may be included within snapshots 92).

When a plurality of snapshots are defined (such as the January snapshot, the February snapshot and the March snapshot for user 36), compensation management process 10 may compare 710 the plurality of snapshots (e.g., snapshots 92). For example, compensation management process 10 may be configured to allow a performance-based employee (e.g., user 36, 38, 40, 42) and/or a manager (e.g., user 56) to compare 710 the plurality of snapshots (e.g., snapshots 92) so that they may monitor (in this example) month-to-month performance and e.g., trends may be determined/predictions may be made.

Additionally and when receiving 702 one or more snapshot requests (e.g. request 86) for at least a portion of the performance information (e.g., performance information 64) at one or more points in time, compensation management process 10 may receive 712 one or more snapshot requests (e.g. request 86) for at least a portion of the performance information (e.g., performance information 64) at one or more points in time at a defined periodicity. Examples of this defined periodicity may include but are not limited to: once daily; once weekly; once monthly; prior to effectuating payroll for the one or more performance-based employees (e.g., users 36, 38, 40, 42); and subsequent to effectuating payroll for the one or more performance-based employees (e.g., users 36, 38, 40, 42).

Concept #8

Figure 9:
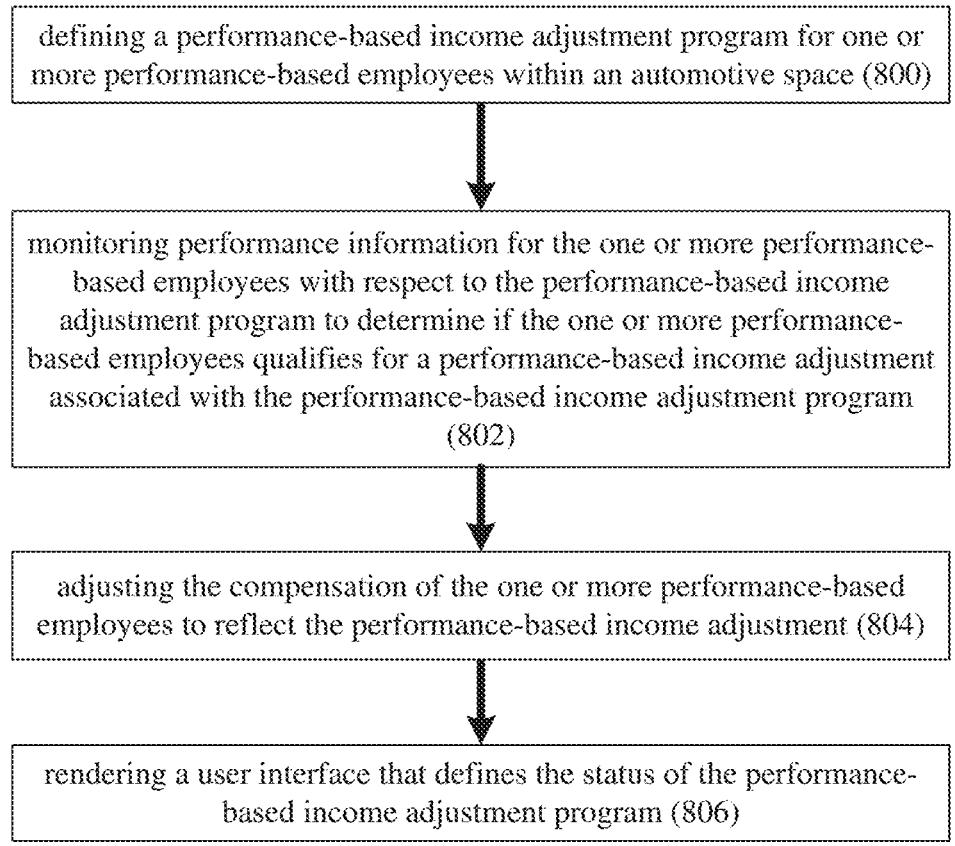
FIG. 9 is a flowchart of an implementation of the compensation management process of FIG. 1 according to an embodiment of the present disclosure.

Referring also to FIG. 9, compensation management process 10 may define 800 a performance-based income adjustment program (e.g., performance-based income adjustment program 94) for one or more performance-based employees (e.g., users 36, 38, 40, 42) within an automotive space. As discussed above, the automotive space may include one or more of: an automotive sales space; an automotive service space; an automotive body shop space; an automotive finance & insurance space; an automotive administrative space; an automotive franchisor space; and an automotive parts space.

This performance-based income adjustment program (e.g., performance-based income adjustment program 94) may be sponsored by various entities, examples of which may include, but are not limited to an automotive dealership (e.g., car dealership 62) and/or an automotive manufacturer BMW, Chevrolet, Nissan). These performance-based income adjustment programs (e.g., performance-based income adjustment program 94) are often referred to as STIFFS. As is known in the art, a SPIFF is slang for an immediate bonus for a sale. Typically, spiffs are paid, either by a manufacturer or employer, directly to a salesperson for selling a specific product.

Compensation management process 10 may monitor 802 performance information (e.g., performance information 64) for the one or more performance-based employees (e.g., users 36, 38, 40, 42) with respect to the performance-based income adjustment program (e.g., performance-based income adjustment program 94) to determine if the one or more performance-based employees (e.g., users 36, 38, 40, 42) qualifies for a performance-based income adjustment (e.g., performance-based income adjustment 96) associated with the performance-based income adjustment program (e.g., performance-based income adjustment program 94).

As discussed above, this performance information (e.g., performance information 64) may include sales performance information (e.g., sales performance information 66), wherein this sales performance information (e.g., sales performance information 66) may include but is not limited to:

a quantity of units sold indicator, a date of units sold indicator, a cost of units sold indicator, a margin of units sold indicator, an incentive concerning units sold indicator, a type of units sold indicator and a timing of units sold indicator.

This sales performance information (e.g., sales performance information 66) may be obtained from one or more of: customer relationship management (CRM) platform 150 (e.g., a platform that enables a user/business to manage their relationship with actual and potential clients), inventory management platform 152 (e.g., a platform that enables a user/business to manage/order/sell their inventory), accounting platform 154 (e.g., a platform that enables a user/business to maintain their finances), proprietary data feed 170 (e.g., such as an internal sales data feed within car dealership 62), proprietary data file 172 (e.g., such as an internal sales data file within car dealership 62), proprietary datastore 174, manually-entered data 176, and dealership management platform 156.

Additionally, the performance information (e.g., performance information 64) may include supplemental performance information (e.g., supplemental performance information 68), wherein this supplemental performance information (e.g., supplemental performance information 68) may include one or more of: an inventory age indicator; a minimum wage indicator; an hours worked indicator; an employment history indicator; a customer feedback indicator; an economic indicator; a team rating indicator; an individual rating indicator; and an organization rating indicator.

This supplemental performance information (e.g., supplemental performance information 68) may be obtained from one or more of: social media platform 158, external rating platform 160, internal rating platform 162, inventory management platform 152, human resource management platform 164, proprietary data feed 170, proprietary data file 172, proprietary datastore 174, manually-entered data 176, and business analytics platform 166.

Compensation management process 10 may adjust 804 the compensation of the one or more performance-based employees (e.g., users 36, 38, 40, 42) to reflect the performance-based income adjustment (e.g., performance-based income adjustment 96).

Examples of the performance-based income adjustment (e.g., performance-based income adjustment 96) may include but are not limited to: a cash-based income adjustment (e.g., user 56 may adjust 804 the compensation of a salesperson by distributing $100 bills to each salesperson that sells a car during a Super Saturday Sale); a paperless income adjustment (e.g., user 56 may adjust 804 the compensation of a salesperson by electronically increasing a salesperson's compensation by $100 each time they sell a car during a Super Saturday Sale); an upward income adjustment (e.g., user 56 may adjust 804 the compensation of a salesperson (upwardly) for meeting/exceeding the requirements of a sales event); and a downward income adjustment (e.g., user 56 may adjust 804 the compensation of a salesperson (downwardly) for failing to meet/exceed the requirements of a sales event).

Compensation management process 10 may render 806 a user interface (e.g., user interface 98) that defines the status of the performance-based income adjustment program (e.g., performance-based income adjustment program 94). User interface 98 may be configured to be accessible by the one or more performance-based employees (e.g., users 36, 38, 40, 42). The status of the performance-based income adjustment program (e.g., performance-based income adjustment program 94) may include one or more of:

- A starting date of the performance-based income adjustment program (e.g., performance-based income adjustment program 94). For example, user interface 98 may define the date on which performance-based income adjustment program 94 will begin/began.
- An ending date of the performance-based income adjustment program (e.g., performance-based income adjustment program 94). For example, user interface 98 may define the date on which performance-based income adjustment program 94 will end/ended.
- A quantity of income adjustments already distributed; a quantity of income adjustments still available; and/or recipients of any distributed income adjustments. For example, user interface 98 may define one or more of: the total value of performance-based income adjustment program 94, the number of income adjustments already made under performance-based income adjustment program 94, the number of income adjustments still available under performance-based income adjustment program 94, and the recipient(s) of any income adjustments already made under performance-based income adjustment program 94.
- A sponsor of the performance-based income adjustment program. For example, user interface 98 stay define car dealership 62 and/or a vehicle manufacturer as the sponsor of performance-based income adjustment program 94.

In the event that additional performance-based income adjustment programs (not shown) are currently available, have been available and/or will be available, user interface 98 may be configured to define the status of all of these performance-based income adjustment programs.

Concept #9

Figure 10:
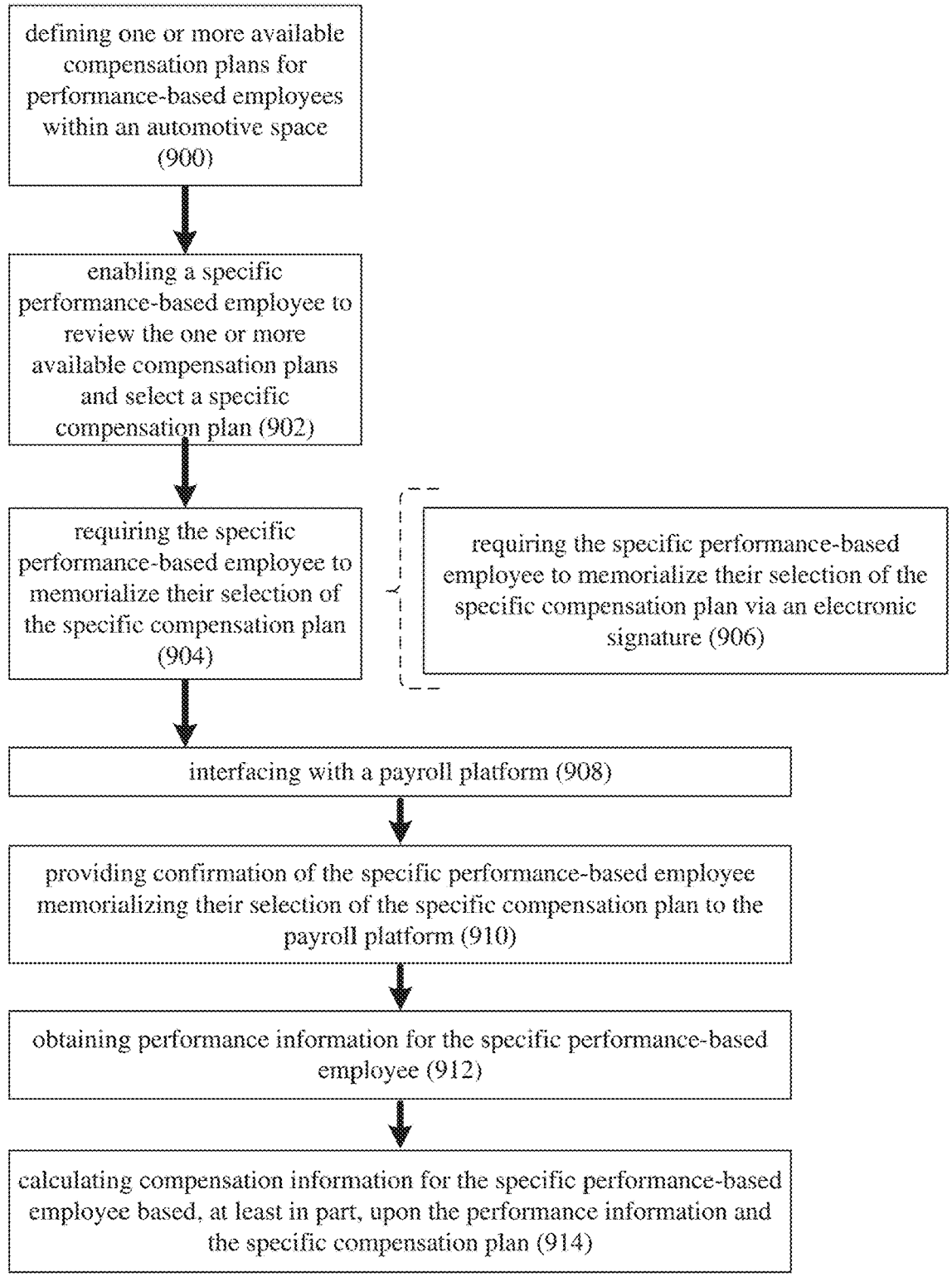
FIG. 10 is a flowchart of an implementation of the compensation management process of FIG. 1 according to an embodiment of the present disclosure.

Referring also to FIG. 10, compensation management process 10 may define 900 one or more available compensation plans (e.g., compensation plans 60) for performance-based employees (e.g., users 36, 38, 40, 42) within an automotive space. As discussed above, the automotive space may include one or more of: an automotive sales space; an automotive service space; an automotive body shop space; an automotive finance & insurance space; an automotive administrative space; an automotive franchisor space; and an automotive parts space. As also discussed above, these performance-based employees (e.g., users 36, 38, 40, 42) may be a performance-based sellers of products and/or services.

Compensation management process 10 may enable 902 a specific performance-based employee (e.g., user 42) to review the one or more available compensation plans (e.g., compensation plans 60) and select a specific compensation plan (e.g., compensation plan 58). For example, assume that when onboarding user 42 with respect to car dealership 62, compensation management process 10 may enable 902 user 42 to review the one or more available compensation plans (e.g., compensation plans 60 and (after reviewing the same) user 42 selects compensation plan 58. Specifically, the quantity of compensation plans being reviewed by user 42 (in this example) may vary from a singular compensation plan to as many compensation plans as car dealership 62 (in this example) is offering. Accordingly, if car dealership 62 only offers one compensation plan, user 42 may review (and select from) one compensation plan. Conversely, if car dealership 62 offers ten compensation plans, user 42 may review (and select from) ten compensation plans.

Compensation management process 10 may require 904 the specific performance-based employee (e.g., user 42) to memorialize their selection of the specific compensation plan (e.g., compensation plan 58).

When requiring 904 the specific performance-based employee (e.g., user 42) to memorialize their selection of the specific compensation plan (e.g., compensation plan 58), compensation management process 10 may require 906 the specific performance-based employee (e.g., user 42) to memorialize their selection of the specific compensation plan (e.g., compensation plan 58) via e.g., an electronic signature, electronic initialing and/or electronic confirmation.

Compensation management process 10 may be configured to interface 908 with a payroll platform (e.g., payroll platform 168), wherein compensation management process 10 may provide 910 confirmation of the specific performance-based employee (e.g., user 42) memorializing their selection of the specific compensation plan (e.g., compensation plan 58) to the payroll platform (e.g., payroll platform 168).

The payroll platform (e.g., payroll platform 168) may be configured to compensate the specific performance-based employee (e.g., user 42) in accordance with the specific compensation plan (e.g., compensation plan 58) only after confirmation of the specific performance-based employee (e.g., user 42) memorializing their selection of the specific compensation plan (e.g., compensation plan 58) is received by the payroll platform (e.g., payroll platform 168). Accordingly, until the specific performance-based employee (e.g., user 42) memorializes their selection of the specific compensation plan (e.g., compensation plan 58), the specific performance-based employee (e.g., user 42) will not get paid by the payroll platform (e.g., payroll platform 168).

Compensation management process 10 may obtain 912 performance information (e.g., performance information 64) for the specific performance-based employee (e.g., user 42).

As discussed above, this performance information (e.g., performance information 64) may include sales performance information (e.g., sales performance information 66), wherein this sales performance information (e.g., sales performance information 66) may include but is not limited to: a quantity of units sold indicator, a date of units sold indicator, a cost of units sold indicator, a margin of units sold indicator, an incentive concerning units sold indicator, a type of units sold indicator and a timing of units sold indicator.

This sales performance information (e.g., sales performance information 66) may be obtained from one or more of: customer relationship management (CRM) platform 150 (e.g., a platform that enables a user/business to manage their relationship with actual and potential clients), inventory management platform 152 (e.g., a platform that enables a user/business to manage/order/sell their inventory), accounting platform 154 (e.g., a platform that enables a user/business to maintain their finances), proprietary data feed 170 (e.g., such as an internal sales data feed within car dealership 62), proprietary data file 172 (e.g., such as an internal sales data file within car dealership 62), proprietary datastore 174, manually-entered data 176, and dealership management platform 156.

Additionally, the performance information (e.g., performance information 64) may include supplemental performance information (e.g., supplemental performance information 68), wherein this supplemental performance information (e.g., supplemental performance information 68) may include one or more of: an inventory age indicator; a minimum wage indicator; an hours worked indicator; an employment history indicator; a customer feedback indicator; an economic indicator; a team rating indicator; an individual rating indicator; and an organization rating indicator.

This supplemental performance information (e.g., supplemental performance information 68) may be obtained from one or more of: social media platform 158, external rating platform 160, internal rating platform 162, inventory management platform 152, human resource management platform 164, proprietary data feed 170, proprietary data file 172, proprietary datastore 174, manually-entered data 176, and business analytics platform 166.

Assuming that confirmation of the specific performance-based employee (e.g., user 42) memorializing their selection of the specific compensation plan (e.g., compensation plan 58) is received by the payroll platform (e.g., payroll platform 168), compensation management process 10 may calculate 914 compensation information (e.g., compensation information 74) for the specific performance-based employee (e.g., user 42) based, at least in part, upon the performance information performance information 64) and the specific compensation plan (e.g., compensation plan 58).

Concept #10

Figure 11:
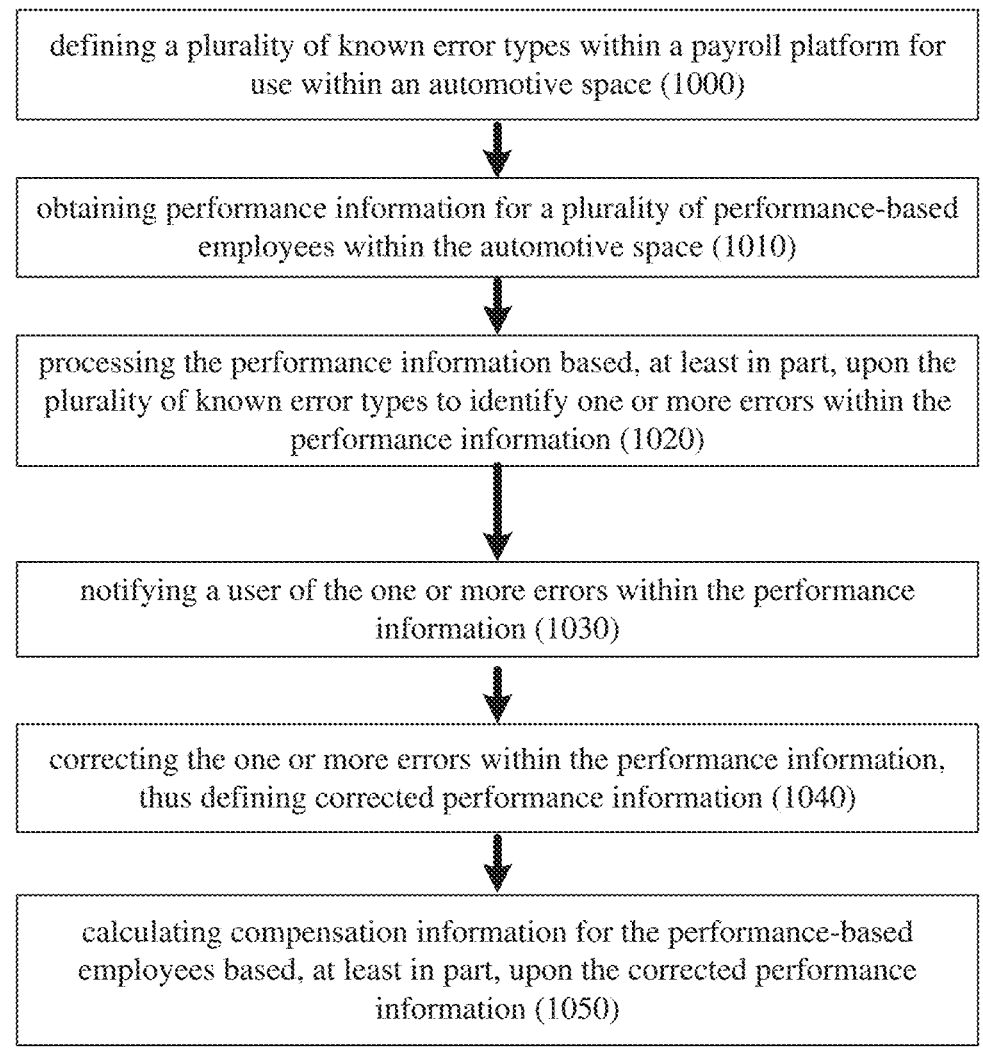
FIG. 11 is a flowchart of an implementation of the compensation management process of FIG. 1 according to an embodiment of the present disclosure.

Referring also to FIG. 11, compensation management process 10 may define 1000 a plurality of known error types (e.g., error types 100) within a payroll platform (e.g., payroll platform 168) for use within an automotive space. As discussed above, the automotive space may include one or more of: an automotive sales space; an automotive service space; an automotive body shop space; an automotive finance & insurance space; an automotive administrative space; an automotive franchisor space; and an automotive parts space. Examples of such known error types may include but are not limited to: inaccurate vehicle cost; inaccurate vehicle profit, inaccurate sales dates, inaccurate commission rates, and inaccurate vehicle descriptions.

Compensation management process 10 may obtain 1010 performance information (e.g., performance information 64) for a plurality of performance-based employees (e.g., users 36, 38, 40, 42) within the automotive space. As discussed above, these performance-based employees (e.g., users 36, 38, 40, 42) may be a performance-based sellers of products and/or services.

As also discussed above, this performance information (e.g., performance information 64) may include sales performance information (e.g., sales performance information 66), wherein this sales performance information (e.g., sales performance information 66) may include but is not limited to: a quantity of units sold indicator, a date of units sold indicator, a cost of units sold indicator, a margin of units sold indicator, an incentive concerning units sold indicator, a type of units sold indicator and a timing of units sold indicator.

This sales performance information (e.g., sales performance information 66) may be obtained from one or more of: customer relationship management (CRM) platform 150 (e.g., a platform that enables a user/business to manage their relationship with actual and potential clients), inventory management platform 152 (e.g., a platform that enables a user/business to manage/order/sell their inventory), accounting platform 154 (e.g., a platform that enables a user/business to maintain their finances), proprietary data feed 170 (e.g., such as an internal sales data feed within car dealership 62), proprietary data file 172 (e.g., such as an internal sales data file within car dealership 62), proprietary datastore 174, manually-entered data 176, and dealership management platform 156.

Additionally, the performance information (e.g., performance information 64) may include supplemental performance information (e.g., supplemental performance information 68), wherein this supplemental performance information (e.g., supplemental performance information 68) may include one or more of: an inventory age indicator; a minimum wage indicator; an hours worked indicator; an employment history indicator; a customer feedback indicator; an economic indicator; a team rating indicator; an individual rating indicator; and an organization rating indicator.

This supplemental performance information (e.g., supplemental performance information 68) may be obtained from one or more of: social media platform 158, external rating platform 160, internal rating platform 162, inventory management platform 152, human resource management platform 164, proprietary data feed 170, proprietary data file 172, proprietary datastore 174, manually-entered data 176, and business analytics platform 166.

Compensation management process 10 may process 1020 the performance information (e.g., performance information 64) based, at least in part, upon the plurality of known error types (e.g., error types 100) to identify one or more errors (e.g., errors 102) within the performance information (e.g., performance information 64). For example, compensation management process 10 may process 1020 the performance information (e.g., performance information 64) to identify e.g., vehicles that have a cost of zero dollars, sales that have an abnormally high low commission rate, vehicles that have a sales date that is some time in the future, etc.

Once these errors (e.g., errors 102) are identified, compensation management process 10 may notify 1030 a user (e.g., user 56) of the one or more errors (e.g., errors 102) within the performance information (e.g., performance information 64).

Additionally/alternatively, compensation management process 10 may correct 1040 the one or more errors (e.g., errors 102) within the performance information (e.g., performance information 64), thus defining corrected performance information (e.g., performance information 64'). Compensation management process 10 may then calculate 1050 the compensation information (e.g., compensation information 70) for the performance-based employees (e.g., users 36, 38, 40, 42) based, at least in part, upon the corrected performance information (e.g., performance information 64').

General

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the flinch is/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A compensation management method, executed on a computing device, comprising:
    enabling a user to define a first compensation plan for one or more performance-based employees within an automotive space;
    enabling the user to define a second compensation plan for the one or more performance-based employees within the automotive space, wherein the first compensation plan and second compensation plan include a specific set of predefined calculations stored on a storage device applied to historical performance data collected from external systems for the one or more performance-based employees;
    comparing the first compensation plan to the second compensation plan to determine one or more differential characteristics for the second compensation plan with respect to the first compensation plan, wherein the one or more differential characteristics include a payroll impact for the one or more performance-based employees and a profitability analysis of the automotive space;
    distributing the one or more differential characteristics with respect to a plurality of performance information indicators;
    generating and displaying a report on a graphical user interface of the computing device, wherein the report is configured to display a commission earned by the automotive space based on a plurality of user-selected compensation plans on a graph that includes the commission on a first axis and the user-selected period of time on a second axis, wherein the plurality of user-selected compensation plans includes the first compensation plan and the second compensation plan; and
    generating a table on the graphical user interface of the computing device, wherein the table includes a name of the one or more performance-based employees, and for each of the one or more performance-based employees during a defined period of time includes
        a number of Customer Satisfaction Index ("CSI") surveys obtained from an external rating platform,
        an average CSI score, and
        a visual indicator of change in the average CSI score.

2. The compensation management method of claim 1 wherein comparing the first compensation plan to the second compensation plan to determine one or more differential characteristics for the second compensation plan with respect to the first compensation plan includes:
    utilizing historical performance information of the one or more performance-based employees to determine the one or more differential characteristics for the second compensation plan with respect to the first compensation plan.

3. The compensation management method of claim 2 wherein the historical performance information includes historical sales performance information.

4. The compensation management method of claim 2 wherein the historical performance information includes historical supplemental performance information.

5. The compensation management method of claim 4 wherein the historical supplemental performance information includes one or more of:
    an inventory age indicator;
    a minimum wage indicator;
    an hours worked indicator;
    an employment history indicator;
    a customer feedback indicator;
    an economic indicator;
    a team rating indicator;
    an individual rating indicator; and
    an organization rating indicator.

6. The computing system of claim 2 wherein the historical performance information includes historical supplemental performance information.

7. The computing system of claim 6 wherein the historical supplemental performance information includes one or more of:
- an inventory age indicator;
- a minimum wage indicator;
- an hours worked indicator;
- an employment history indicator;
- a customer feedback indicator;
- an economic indicator;
- a team rating indicator;
- an individual rating indicator; and
- an organization rating indicator.

8. The compensation management method of claim 1 wherein comparing the first compensation plan to the second compensation plan to determine one or more differential characteristics for the second compensation plan with respect to the first compensation plan includes:
- utilizing predicted performance information of the one or more performance-based employees to determine the one or more differential characteristics for the second compensation plan with respect to the first compensation plan.

9. The compensation management method of claim 8 wherein the predicted performance information includes predicted sales performance information.

10. The compensation management method of claim 8 wherein the predicted performance information includes predicted supplemental performance information.

11. The compensation management method of claim 10 wherein the predicted supplemental performance information includes one or more of:
- an inventory age indicator;
- a minimum wage indicator;
- an hours worked indicator;
- an employment history indicator;
- a customer feedback indicator;
- an economic indicator;
- a team rating indicator;
- an individual rating indicator; and
- an organization rating indicator.

12. The compensation management method of claim 1 wherein the automotive space includes one or more of:
- an automotive sales space;
- an automotive service space;
- an automotive body shop space;
- an automotive finance & insurance space;
- an automotive administrative space;
- an automotive franchisor space; and
- an automotive parts space.

13. The compensation management method of claim 1 wherein the one or more performance-based employees are one or more performance-based sellers of products.

14. The compensation management method of claim 1 wherein the one or more performance-based employees are one or more performance-based sellers of services.

15. The compensation management method of claim 1 wherein enabling a user to define a first compensation plan for one or more performance-based employees includes:
- enabling the user to define the first compensation plan for one or more performance-based employees by selecting the first compensation plan from a plurality of available compensation plans.

16. The compensation management method of claim 1 wherein enabling a user to define a first compensation plan for one or more performance-based employees includes:
- enabling the user to define a bespoke first compensation plan for the one or more performance-based employees.

17. The compensation management method of claim 1 wherein enabling a user to define a second compensation plan for one or more performance-based employees includes:
- enabling the user to define the second compensation plan for one or more performance-based employees by selecting the second compensation plan from a plurality of available compensation plans.

18. The compensation management method of claim 1 wherein enabling a user to define a second compensation plan for one or more performance-based employees includes:
- enabling the user to define a bespoke second compensation plan for the one or more performance-based employees.

19. A computer program product residing on a computer readable medium having a plurality of instructions stored thereon which, when executed by a processor, cause the processor to perform operations comprising:
- enabling a user to define a first compensation plan for one or more performance-based employees within an automotive space;
- enabling the user to define a second compensation plan for the one or more performance-based employees within the automotive space, wherein the first compensation plan and second compensation plan include a specific set of predefined calculations stored on a storage device applied to historical performance data collected from external systems for the one or more performance-based employees;
- comparing the first compensation plan to the second compensation plan to determine one or more differential characteristics for the second compensation plan with respect to the first compensation plan, wherein the one or more differential characteristics include a payroll impact for the one or more performance-based employees and a profitability analysis of the automotive space;
- distributing the one or more differential characteristics with respect to a plurality of performance information indicators;
- generating and displaying a report on a graphical user interface of the computing device, wherein the report is configured to display a commission earned by the automotive space based on a plurality of user-selected compensation plans on a graph that includes the commission on a first axis and the user-selected period of time on a second axis, wherein the plurality of user-selected compensation plans includes the first compensation plan and the second compensation plan; and
- generating a table on the graphical user interface of the computing device, wherein the table includes a name of the one or more performance-based employees, and for each of the one or more performance-based employees during a defined period of time includes
  - a number of Customer Satisfaction Index ("CSI") surveys obtained from an external rating platform,
  - an average CSI score, and
  - a visual indicator of change in the average CSI score.

20. The computer program product of claim 19 wherein comparing the first compensation plan to the second compensation plan to determine one or more differential characteristics for the second compensation plan with respect to the first compensation plan includes:

utilizing historical performance information of the one or more performance-based employees to determine the one or more differential characteristics for the second compensation plan with respect to the first compensation plan.

21. The computer program product of claim 20 wherein the historical performance information includes historical sales performance information.

22. The computer program product of claim 20 wherein the historical performance information includes historical supplemental performance information.

23. The computer program product of claim 22 wherein the historical supplemental performance information includes one or more of:
an inventory age indicator;
a minimum wage indicator;
an hours worked indicator;
an employment history indicator;
a customer feedback indicator;
an economic indicator;
a team rating indicator;
an individual rating indicator; and
an organization rating indicator.

24. The computer program product of claim 19 wherein comparing the first compensation plan to the second compensation plan to determine one or more differential characteristics for the second compensation plan with respect to the first compensation plan includes:
utilizing predicted performance information of the one or more performance-based employees to determine the one or more differential characteristics for the second compensation plan with respect to the first compensation plan.

25. The computer program product of claim 24 wherein the predicted performance information includes predicted sales performance information.

26. The computer program product of claim 25 wherein the predicted performance information includes predicted supplemental performance information.

27. The computer program product of claim 26 wherein the predicted supplemental performance information includes one or more of:
an inventory age indicator;
a minimum wage indicator;
an hours worked indicator;
an employment history indicator;
a customer feedback indicator;
an economic indicator;
a team rating indicator;
an individual rating indicator; and
an organization rating indicator.

28. The computer program product of claim 19 wherein the automotive space includes one or more of:
an automotive sales space;
an automotive service space;
an automotive body shop space;
an automotive finance & insurance space;
an automotive administrative space;
an automotive franchisor space; and
an automotive parts space.

29. The computer program product of claim 19 wherein the one or more performance-based employees are one or more performance-based sellers of products.

30. The computer program product of claim 19 wherein the one or more performance-based employees are one or more performance-based sellers of services.

31. The computer program product of claim 19 wherein enabling a user to define a first compensation plan for one or more performance-based employees includes:
enabling the user to define the first compensation plan for one or more performance-based employees by selecting the first compensation plan from a plurality of available compensation plans.

32. The computer program product of claim 19 wherein enabling a user to define a first compensation plan for one or more performance-based employees includes:
enabling the user to define a bespoke first compensation plan for the one or more performance-based employees.

33. The computer program product of claim 19 wherein enabling a user to define a second compensation plan for one or more performance-based employees includes:
enabling the user to define the second compensation plan for one or more performance-based employees by selecting the second compensation plan from a plurality of available compensation plans.

34. The computer program product of claim 19 wherein enabling a user to define a second compensation plan for one or more performance-based employees includes:
enabling the user to define a bespoke second compensation plan for the one or more performance-based employees.

35. A computing system including a processor and memory configured to perform operations comprising:
enabling a user to define a first compensation plan for one or more performance-based employees within an automotive space;
enabling the user to define a second compensation plan for the one or more performance-based employees within the automotive space, wherein the first compensation plan and second compensation plan include a specific set of predefined calculations stored on a storage device applied to historical performance data collected from external systems for the one or more performance-based employees;
comparing the first compensation plan to the second compensation plan to determine one or more differential characteristics for the second compensation plan with respect to the first compensation plan, wherein the one or more differential characteristics include a payroll impact for the one or more performance-based employees and a profitability analysis of the automotive space;
distributing the one or more differential characteristics with respect to a plurality of performance information indicators;
generating and displaying a report on a graphical user interface of the computing device, wherein the report is configured to display a commission earned by the automotive space based on a plurality of user-selected compensation plans on a graph that includes the commission on a first axis and the user-selected period of time on a second axis, wherein the plurality of user-selected compensation plans includes the first compensation plan and the second compensation plan; and
generating a table on the graphical user interface of the computing device, wherein the table includes a name of the one or more performance-based employees, and for each of the one or more performance-based employees during a defined period of time includes a number of Customer Satisfaction Index ("CSI") surveys obtained from an external rating platform,
an average CSI score, and
a visual indicator of change in the average CSI score.

36. The computing system of claim 35 wherein comparing the first compensation plan to the second compensation plan to determine one or more differential characteristics for the second compensation plan with respect to the first compensation plan includes:
utilizing historical performance information of the one or more performance-based employees to determine the one or more differential characteristics for the second compensation plan with respect to the first compensation plan.

37. The computing system of claim 36 wherein the historical performance information includes historical sales performance information.

38. The computing system of claim 35 wherein comparing the first compensation plan to the second compensation plan to determine one or more differential characteristics for the second compensation plan with respect to the first compensation plan includes:
utilizing predicted performance information of the one or more performance-based employees to determine the one or more differential characteristics for the second compensation plan with respect to the first compensation plan.

39. The computing system of claim 38 wherein the predicted performance information includes predicted sales performance information.

40. The computing system of claim 38 wherein the predicted performance information includes predicted supplemental performance information.

41. The computing system of claim 40 wherein the predicted supplemental performance information includes one or more of:
an inventory age indicator;
a minimum wage indicator;
an hours worked indicator;
an employment history indicator;
a customer feedback indicator;
an economic indicator;
a team rating indicator;
an individual rating indicator; and
an organization rating indicator.

42. The computing system of claim 35 wherein the automotive space includes one or more of:
an automotive sales space;
an automotive service space;
an automotive body shop space;
an automotive finance & insurance space;
an automotive administrative space;
an automotive franchisor space; and
an automotive parts space.

43. The computing system of claim 35 wherein the one or more performance-based employees are one or more performance-based sellers of products.

44. The computing system of claim 35 wherein the one or more performance-based employees are one or more performance-based sellers of services.

45. The computing system of claim 35 wherein enabling a user to define a first compensation plan for one or more performance-based employees includes:
enabling the user to define the first compensation plan for one or more performance-based employees by selecting the first compensation plan from a plurality of available compensation plans.

46. The computing system of claim 35 wherein enabling a user to define a first compensation plan for one or more performance-based employees includes:
enabling the user to define a bespoke first compensation plan for the one or more performance-based employees.

47. The computing system of claim 35 wherein enabling a user to define a second compensation plan for one or more performance-based employees includes:
enabling the user to define the second compensation plan for one or more performance-based employees by selecting the second compensation plan from a plurality of available compensation plans.

48. The computing system of claim 35 wherein enabling a user to define a second compensation plan for one or more performance-based employees includes:
enabling the user to define a bespoke second compensation plan for the one or more performance-based employees.

* * * * *